(12) United States Patent  (10) Patent No.: US 11,751,235 B2
Li et al.  (45) Date of Patent: Sep. 5, 2023

(54) INFORMATION TRANSMISSION METHOD AND DEVICE

(71) Applicant: BEIJING XIAOMI MOBILE SOFTWARE CO., LTD., Beijing (CN)

(72) Inventors: Yuanyuan Li, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 252 days.

(21) Appl. No.: 17/053,712

(22) PCT Filed: May 15, 2018

(86) PCT No.: PCT/CN2018/086907
§ 371 (c)(1),
(2) Date: Nov. 6, 2020

(87) PCT Pub. No.: WO2019/218160
PCT Pub. Date: Nov. 21, 2019

(65) Prior Publication Data
US 2021/0377961 A1  Dec. 2, 2021

(51) Int. Cl.
*H04W 72/10* (2009.01)
*H04W 72/04* (2023.01)
(Continued)

(52) U.S. Cl.
CPC .......... *H04W 72/56* (2023.01); *H04L 1/0038* (2013.01); *H04W 72/0466* (2013.01); *H04W 72/23* (2023.01)

(58) Field of Classification Search
CPC .............. H04W 72/10; H04W 72/042; H04W 72/0466; H04L 1/0038; H04L 1/08; H04L 5/006; H04L 5/0064; H04L 5/0053
See application file for complete search history.

(56) References Cited

U.S. PATENT DOCUMENTS 9,313,679 B2  4/2016  Li et al.
10,966,196 B2  3/2021  Feng
(Continued)

FOREIGN PATENT DOCUMENTS

CN  103346869 A  10/2013
CN  106793143 A  5/2017
(Continued)

OTHER PUBLICATIONS

Huawei et al: "Blind/HARQ-less Repetition for Scheduled DL-SCH Operation", 3GPP Draft: R1-1803711, 3rd Generation Partnership Project (3GPP), Mobile Competence Centre: 650, Route Desucioles: F-06921 Sophia-Antipolis Cedex ; FRANCE vol. RAN WG1, No. Sanya, China; Apr. 16, 2018-Apr. 20, 2018, XP051412887, Retrieved from the Internet:URL:http://www.3gpp.org/ftp/tsg 5Fran/WG1% 5FRL1/TSGR1%5F92b/Docs/[retrieved on Apr. 5, 2018] *figures 1, 2*, (8p).

(Continued)

*Primary Examiner* — Hoang-Chuong Q Vu
(74) *Attorney, Agent, or Firm* — Arch & Lake LLP

(57) ABSTRACT

Provided in the present disclosure are an information transmission method and device, the method being used for an information transmission terminal and comprising: dividing DCI to be transmitted into at least one DCI data block group; configuring different specific transmission resources for each DCI data block group; bearing each DCI data block group on the specific transmission resources corresponding thereto, and transmitting the groups to an information receiving terminal. Hence, employing the present disclosure may implement the transmission of DCI blocks and may also improve the reliability and accuracy of information transmission.

14 Claims, 14 Drawing Sheets

(51) Int. Cl.
*H04L 1/00* (2006.01)
*H04W 72/56* (2023.01)
*H04W 72/044* (2023.01)
*H04W 72/23* (2023.01)

(56) References Cited

U.S. PATENT DOCUMENTS

| | | | | |
|---|---|---|---|---|
| 11,122,552 | B2* | 9/2021 | Lee | H04W 72/042 |
| 11,140,747 | B2* | 10/2021 | Sano | H04L 5/0092 |
| 11,412,517 | B2* | 8/2022 | Kwak | H04W 72/0466 |
| 2012/0093118 | A1* | 4/2012 | Peters | H04L 5/0053 |
| | | | | 370/329 |
| 2013/0223356 | A1* | 8/2013 | Khoshnevis | H04W 72/042 |
| | | | | 370/329 |
| 2013/0250893 | A1 | 9/2013 | Li et al. | |
| 2016/0191222 | A1 | 6/2016 | Li et al. | |
| 2016/0205525 | A1* | 7/2016 | Baghel | H04W 52/281 |
| | | | | 370/329 |
| 2016/0345314 | A1 | 11/2016 | Webb et al. | |
| 2018/0115984 | A1* | 4/2018 | Sahlin | H04W 72/14 |
| 2018/0124753 | A1 | 5/2018 | Sun et al. | |
| 2018/0131494 | A1 | 5/2018 | Li et al. | |
| 2018/0338307 | A1 | 11/2018 | Feng | |
| 2018/0375636 | A1* | 12/2018 | You | H04L 5/0092 |
| 2019/0081820 | A1* | 3/2019 | Urabayashi | H04L 27/0006 |
| 2019/0223209 | A1* | 7/2019 | Li | H04L 5/00 |
| 2019/0306838 | A1* | 10/2019 | Hui | H04L 1/0041 |
| 2019/0342905 | A1* | 11/2019 | Ren | H04L 1/0006 |
| 2019/0349780 | A1* | 11/2019 | Li | H04L 5/006 |
| 2020/0045771 | A1* | 2/2020 | Sano | H04W 72/23 |
| 2020/0100219 | A1* | 3/2020 | Takeda | H04W 72/23 |
| 2020/0229153 | A1* | 7/2020 | Kwak | H04W 72/042 |
| 2020/0359407 | A1* | 11/2020 | Takeda | H04L 5/0094 |
| 2020/0367276 | A1* | 11/2020 | Kwak | H04L 1/0017 |
| 2020/0413416 | A1* | 12/2020 | Jiang | H04W 72/044 |
| 2021/0076376 | A1 | 3/2021 | Feng | |
| 2021/0112528 | A1* | 4/2021 | Lee | H04W 72/23 |

FOREIGN PATENT DOCUMENTS

| | | |
|---|---|---|
| CN | 106856613 A | 6/2017 |
| CN | 107888358 A | 4/2018 |
| WO | 2017156788 A1 | 9/2017 |
| WO | 2018059466 A1 | 4/2018 |

OTHER PUBLICATIONS

Supplementary European Search Report in the European application No. 18918989.7, dated Nov. 24, 2021, (9p).
Office Action of the Indian application No. 202047053636, dated Dec. 23, 2021, (5p).
First Office Action of the Chinese Application No. 201880000647.0, dated Feb. 25, 2022, with English translation, (19p).
English translation of the Written Opinion of the International Search Authority in the international application No. PCT/CN2018/086907, dated Feb. 12, 2019, (4p).
International Search Report of PCT Application No. PCT/CN2018/086907 dated Feb. 12, 2019 and English translation (4p).

* cited by examiner

INFORMATION TRANSMISSION METHOD AND DEVICE

CROSS-REFERENCE TO RELATED APPLICATION

This Application is the National Stage of International Application No. PCT/CN2018/086907 filed on May 15, 2018, the content of which is incorporated herein by reference in its entirety for all purposes.

TECHNICAL FIELD

The present disclosure relates to the technical field of communications, and more particularly, to an information transmission method and device.

BACKGROUND

In a new-generation communication system, flexible configuration for supporting multiple service types is required. Moreover, different service types correspond to different requirements. For example, a main requirement of an ultra reliable low latency communication (URLLC) service type focuses on relatively high reliability and low latency. Therefore, for a URLLC service, a requirement on the reliability of downlink control information (DCI) transmitted in a physical downlink control channel (PDCCH) is relatively high.

SUMMARY

For solving the problem in a related art, embodiments of the present disclosure provide an information transmission method and device.

According to a first aspect of the present disclosure, an information transmission method is provided, which may be applied to an information sender and may include: DCI to be sent is divided into at least one DCI data block group; different specified transmission resources are configured for the at least one DCI data block group; each DCI data block group is born in the corresponding specified transmission resource; and the DCI data block group is sent to an information receiver.

According to a second aspect of the present disclosure, an information transmission method is provided, which may be applied to an information receiver and may include: at least one specified transmission resource for information reception is determined; at least one DCI data block group sent by an information sender is received on each specified transmission resource, and the at least one DCI data block group is obtained by dividing DCI to be sent by the information sender; and the DCI to be sent is determined according to each DCI data block group.

According to a third aspect of the present disclosure, an information transmission device is provided, which may be applied to an information sender and include: a division module, configured to divide DCI to be sent into at least one DCI data block group; a configuration module, configured to configure different specified transmission resources for the at least one DCI data block group; and a first sending module, configured to bear each DCI data block group in the corresponding specified transmission resource and send the DCI data block group to an information receiver.

According to a fourth aspect of the present disclosure, an information transmission device is provided, which may be applied to an information receiver and may include: a resource determination module, configured to determine at least one specified transmission resource for information reception; a DCI receiving module, configured to receive at least one DCI data block group sent by an information sender on each specified transmission resource, the at least one DCI data block group being obtained by dividing DCI to be sent by the information sender; and a DCI determination module, configured to determine the DCI to be sent according to each DCI data block group.

According to a fifth aspect of the present disclosure, a non-transitory computer-readable storage medium is provided, in which a computer program is stored, the computer program may be configured to execute any information transmission method provided in the first aspect.

According to a sixth aspect of the present disclosure, a non-transitory computer-readable storage medium is provided, in which a computer program is stored, the computer program may be configured to execute any information transmission method provided in the second aspect.

According to a seventh aspect of the present disclosure, an information transmission device is provided, which may be applied to an information sender and may include: a memory configured to store instructions executable by a processor.

According to an eighth aspect of the present disclosure, an information transmission device is provided, which may be applied to an information receiver and include: a processor; and a memory configured to store instructions executable by the processor.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. "A/an", "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms first, second, third and the like may be adopted to describe various information in the present disclosure, the information should not be limited to these terms. These terms are only adopted to distinguish the information of the same type. For example, without departing from the scope of the present disclosure, indication information may also be called second information and, similarly, second information may also be called indication information. For example, term "if" used here may be explained as "while" or "when" or "responsive to determining", which depends on the context.

Figure 1:
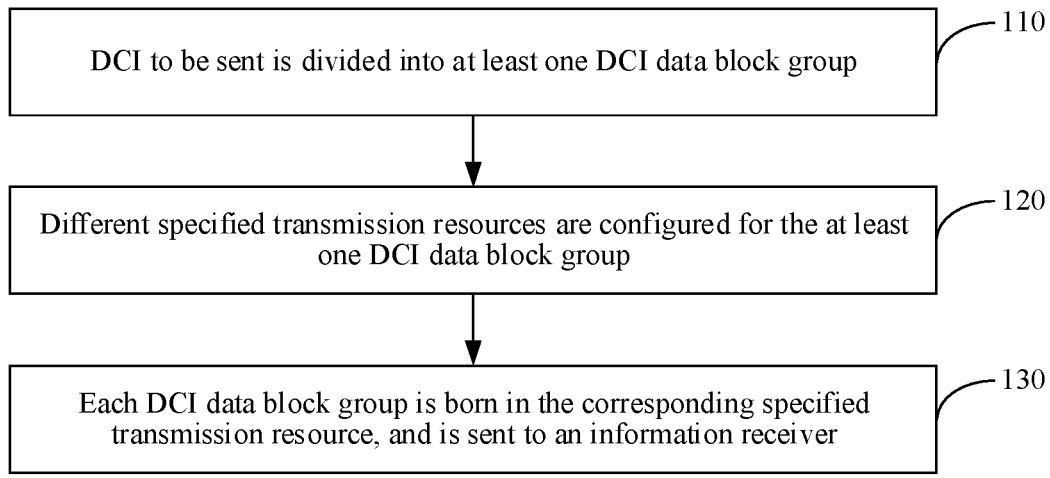
FIG. 1 is a flow chart showing an information transmission method, according to an exemplary embodiment.
Figure 2:
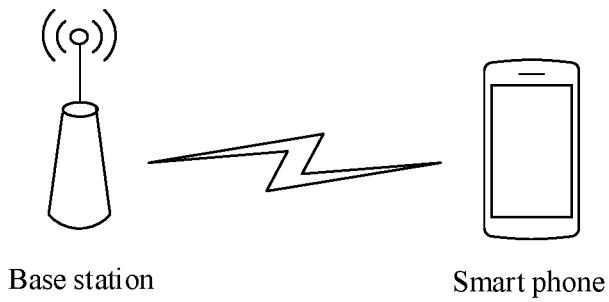
FIG. 2 is a diagram of an application scenario of an information transmission method, according to an exemplary embodiment.

FIG. 1 is a flow chart showing an information transmission method, according to an exemplary embodiment. FIG. 2 is a diagram of an application scenario of an information transmission method, according to an exemplary embodiment. The information transmission method may be applied to an information sender. The information sender may be a base station/an Evolved Node B (eNB), and may also be a home nodeB (HeNB), and the like. As illustrated in FIG. 1, the information transmission method includes the following steps 110 to 130.

In step 110, DCI to be sent is divided into at least one DCI data block group.

In the embodiment of the present disclosure, the information sender may divide the DCI to be sent into one or more DCI data block groups according to a practical condition.

In an embodiment, when step 110 is executed, the DCI to be sent may be divided into the at least one DCI data block group according to a set grouping rule. The set grouping rule may include, but is not limited to, at least one of the following conditions.

(1-1) The set grouping rule includes a first grouping rule configured to indicate grouping according to an emergency degree of an information content, and the first grouping rule includes a first corresponding relationship between a specified information content and a specified emergency degree. A specific implementation process thereof may refer to the embodiment illustrated in FIG. 3.

(1-2) The set grouping rule includes a second grouping rule configured to indicate grouping according to channel quality, and the second grouping rule includes a second corresponding relationship between a specified length for/of each DCI data block group and the specified channel quality. A specific implementation process thereof may refer to the embodiment illustrated in FIG. 5.

(1-3) The set grouping rule includes a third grouping rule configured to indicate grouping according to a fixed length of each DCI data block group, and the third grouping rule includes the fixed length of each DCI data block group. A specific implementation process thereof may refer to the embodiment illustrated in FIG. 6.

(1-4) The set grouping rule includes a fourth grouping rule configured to indicate repeated transmission, and the fourth grouping rule includes a first sub-rule configured to determine a repeatedly transmitted content and a second sub-rule configured to determine each DCI data block group for repeated transmission. A specific implementation process thereof may refer to the embodiment illustrated in FIG. 7.

In step 120, different specified transmission resources are configured for the at least one DCI data block group.

In the embodiment of the present disclosure, when different specified transmission resources are configured, one specified transmission resource may be configured for each DCI data block group, and different DCI data block groups correspond to different specified transmission resources.

In an embodiment, the specified transmission resource may be a specified subframe. For example, the DCI to be sent is divided into N DCI data block groups, a specified transmission resource configured for the first DCI data block group is a specified subframe 1, a specified transmission resource configured for the second DCI data block group is a specified subframe 2, . . . , and a specified transmission resource configured for the Nth DCI data block group is a specified subframe N.

In step 130, each DCI data block group is born in the corresponding specified transmission resource, and is sent to an information receiver.

In the embodiment of the present disclosure, each DCI data block group may correspond to one specified transmission resource, and then the corresponding DCI data block group may be sent to the information receiver through the specified transmission resource.

In an embodiment, when step 130 is executed, preprocessing for information transmission may be performed on each DCI data block group at first to obtain a preprocessed DCI data block group, and then each preprocessed DCI data block group is born in the corresponding specified transmission resource and sent to the information receiver. A specific preprocessing process may refer to the embodiment illustrated in FIG. 9.

In an exemplary application scenario, as illustrated in FIG. 2, a base station serving as an information sender and a smart phone serving as an information receiver are included. The base station may divide DCI to be sent into at least one DCI data block group, configure different specified transmission resources for the at least one DCI data block group, bear each DCI data block group in the corresponding specified transmission resource, and send it to the smart phone. The smart phone may receive the at least one DCI data block group sent by the information sender on each specified transmission resource, and determine the DCI to be sent according to each DCI data block group.

It can be seen from the embodiment that the DCI to be sent is divided into the at least one DCI data block group for which different specified transmission resources are configured, each DCI data block group is born in the corresponding specified transmission resource and sent to the information receiver, such that block(ed) transmission of the DCI is implemented, and the reliability and accuracy of the information transmission are also improved.

Figure 3:
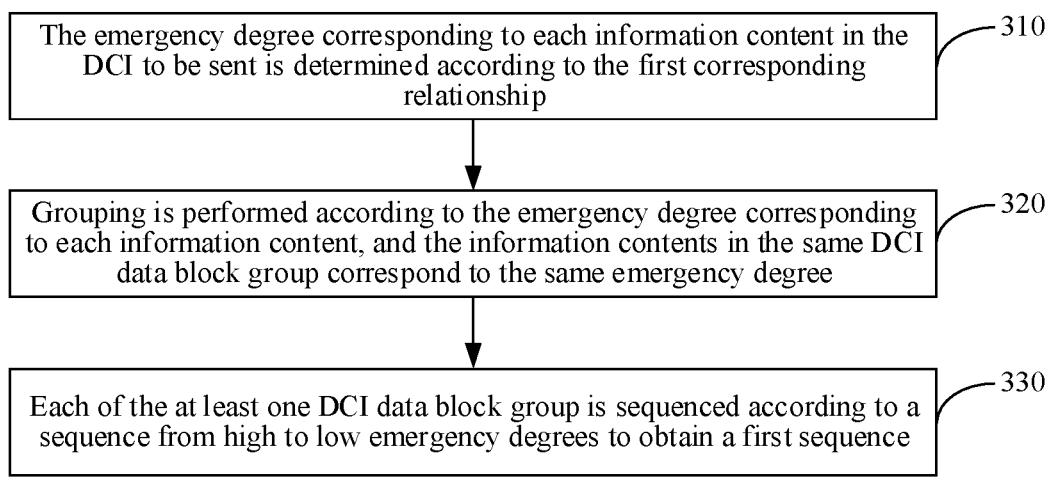
FIG. 3 is a flow chart showing another information transmission method, according to an exemplary embodiment.

FIG. 3 is a flow chart showing another information transmission method, according to an exemplary embodiment. The information transmission method may be applied to an information sender and is based on the method illustrated in FIG. 1. When step 110 is executed, the DCI to be sent may be divided into the at least one DCI data block group according to the set grouping rule. The set grouping rule includes the first grouping rule configured to indicate grouping according to the emergency degree of the information content, and the first grouping rule includes the first corresponding relationship between the specified information content and the specified emergency degree. As illustrated in FIG. 3, the following steps 310 to 330 may be included.

In step 310, the emergency degree corresponding to each information content in the DCI to be sent is determined according to the first corresponding relationship.

In the embodiment of the present disclosure, the first corresponding relationship is preset by the information sender, and the emergency degree may refer to a requirement on a transmission sequence of the information contents. For example, a high emergency degree indicates that a corresponding information content is required to be preferentially sent, and a low emergency degree indicates that a corresponding information content may be delayed to be sent.

In step 320, grouping is performed according to the emergency degree corresponding to each information content, and the information contents in the same DCI data block group correspond to the same emergency degree.

In step 330, each of the at least one DCI data block group is sequenced according to a sequence from high to low emergency degrees to obtain a first sequence.

In the embodiment of the present disclosure, each DCI data block group is sequenced according to the sequence from the high to low emergency degrees for a purpose of preferentially sending the information contents with high emergency degrees and delaying sending of the information contents with low emergency degrees.

It can be seen from the embodiment that grouping is performed according to the emergency degree corresponding to each information content, so as to ensure that the information contents with high emergency degrees are preferentially sent and the information contents with low emergency degrees are delayed to be sent, thereby improving the information transmission flexibility.

Figure 4:
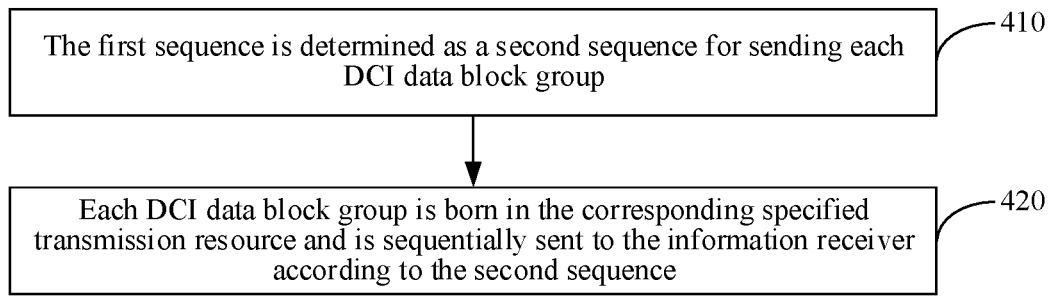
FIG. 4 is a flow chart showing another information transmission method, according to an exemplary embodiment.

FIG. 4 is a flow chart showing another information transmission method, according to an exemplary embodiment. The information transmission method may be applied to an information sender and is based on the method illustrated in FIG. 3. When step 130 is executed, as illustrated in FIG. 4, the following steps 410 to 420 may be included.

In step 410, the first sequence is determined as a second sequence for sending each DCI data block group.

In the embodiment of the present disclosure, the first sequence is identical with the second sequence, that is, each DCI data block group is sequenced according to the sequence from the high to low emergency degrees, and the sequence is also a sending sequence corresponding to each DCI data block group.

In step 420, each DCI data block group is born in the corresponding specified transmission resource and is sequentially sent to the information receiver according to the second sequence.

It can be seen from the embodiment that the information contents with high emergency degrees are preferentially sent and the information contents with low emergency degrees are delayed to be sent, such that the information transmission practicability is improved.

Figure 5:
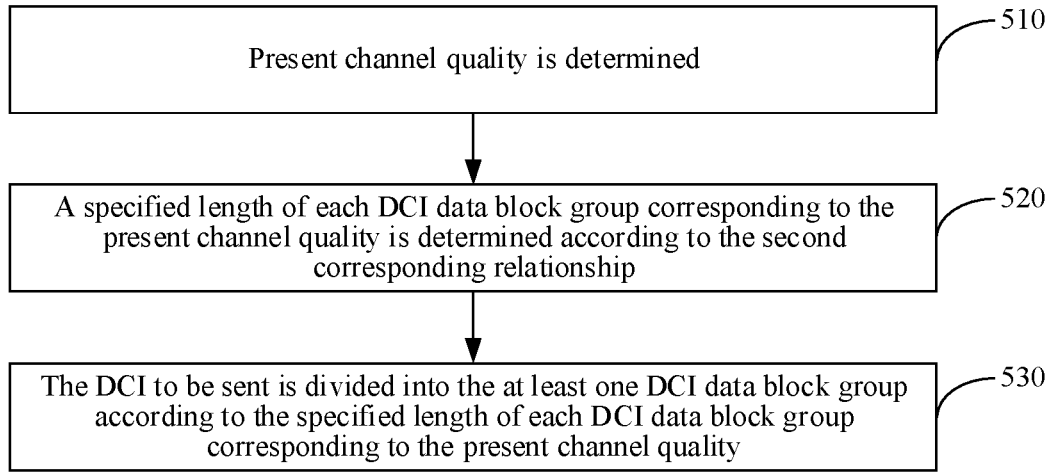
FIG. 5 is a flow chart showing another information transmission method, according to an exemplary embodiment.

FIG. 5 is a flow chart showing another information transmission method, according to an exemplary embodiment. The information transmission method may be applied to an information sender and is based on the method illustrated in FIG. 1. When step 110 is executed, the DCI to be sent may be divided into the at least one DCI data block group according to the set grouping rule. The set grouping rule includes the second grouping rule configured to indicate grouping according to the channel quality, and the second grouping rule includes the second corresponding relationship between the specified length for each DCI data block group and the specified channel quality. As illustrated in FIG. 5, the following steps 510 to 530 may be included.

In step 510, present channel quality is determined.

In the embodiment of the present disclosure, the present channel quality may specify a channel state value of a PDCCH configured to send the DCI data block group.

In step 520, a specified length of each DCI data block group corresponding to the present channel quality is determined according to the second corresponding relationship.

In the embodiment of the present disclosure, the second corresponding relationship is preset by the information sender for a purpose that the corresponding specified lengths may be dynamically determined according to different channel quality. Particularly, when the channel quality is relatively high, the DCI to be sent may also be divided into one DCI data block group, that is, the DCI to be sent may not be grouped.

In step 530, the DCI to be sent is divided into the at least one DCI data block group according to the specified length of each DCI data block group corresponding to the present channel quality.

It can be seen from the embodiment that the DCI to be sent may be divided into the at least one DCI data block group according to the specified length of each DCI data block group corresponding to the present channel quality, such that the DCI grouping accuracy is improved, and the information transmission reliability is also improved.

Figure 6:
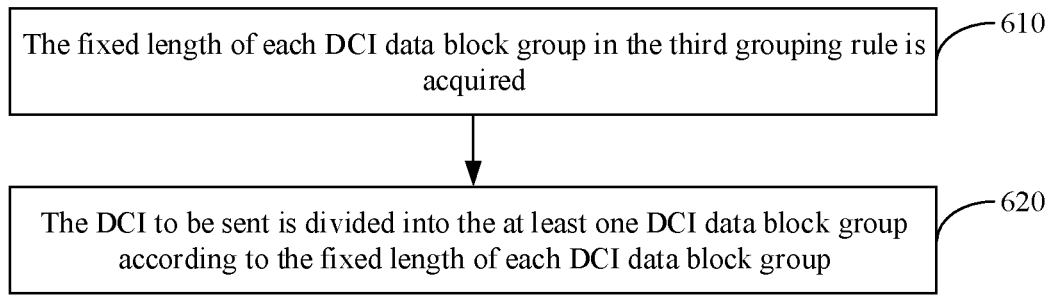
FIG. 6 is a flow chart showing another information transmission method, according to an exemplary embodiment.

FIG. 6 is a flow chart showing another information transmission method, according to an exemplary embodiment. The information transmission method may be applied to an information sender and is based on the method illustrated in FIG. 1. When step 110 is executed, the DCI to be sent may be divided into the at least one DCI data block group according to the set grouping rule. The set grouping rule includes the third grouping rule configured to indicate grouping according to the fixed length of each DCI data block group, and the third grouping rule includes the fixed length of each DCI data block group. As illustrated in FIG. 6, the following steps 610 to 620 may be included.

In step 610, the fixed length of each DCI data block group in the third grouping rule is acquired.

In the embodiment of the present disclosure, the fixed length of each DCI data block group may be preset by the information sender for a purpose that grouping may be performed according to the fixed length, that is, a length of each DCI data block group is fixed. When the length of a certain DCI data block group is less than the fixed length, zero filling is performed till the fixed length.

In step 620, the DCI to be sent is divided into the at least one DCI data block group according to the fixed length of each DCI data block group.

It can be seen from the embodiment that the DCI to be sent may be divided into the at least one DCI data block group according to the fixed length of each DCI data block group, such that different DCI grouping requirements are met, and the information transmission efficiency is also improved.

Figure 7:
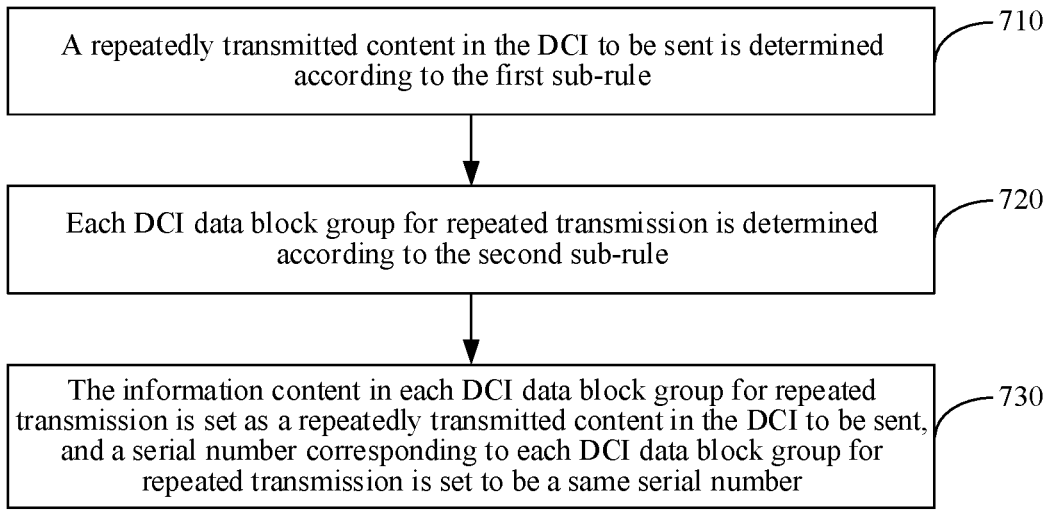
FIG. 7 is a flow chart showing another information transmission method, according to an exemplary embodiment.

FIG. 7 is a flow chart showing another information transmission method, according to an exemplary embodiment. The information transmission method may be applied to an information sender and is based on the method illustrated in FIG. 1. When step 110 is executed, the DCI to be sent may be divided into the at least one DCI data block group according to the set grouping rule. The set grouping rule includes the fourth grouping rule configured to indicate repeated transmission, and the fourth grouping rule includes the first sub-rule configured to determine the repeatedly transmitted content and the second sub-rule configured to determine each DCI data block group for repeated transmission. As illustrated in FIG. 7, the following steps 710 to 730 may be included.

In step 710, a repeatedly transmitted content in the DCI to be sent is determined according to the first sub-rule.

In the embodiment of the present disclosure, the first sub-rule and the second sub-rule may be preset by the information sender for a purpose of implementing repeated transmission, that is, different DCI data block groups may be repeated. For example, a same content may be transmitted through a DCI data block group X and a DCI data block group Y. In addition, the same information content may be transmitted through multiple DCI data block groups, thereby obtaining diversity and combination gains. Moreover, serial numbers of the multiple DCI data block groups configured to transmit the same information content may be the same.

The first sub-rule may include multiple manners configured to determine the repeatedly transmitted content. For example, if some information contents are indivisible and a present transmission condition is relatively poor, the same information content may be transmitted through multiple DCI data block groups.

In step 720, each DCI data block group for repeated transmission is determined according to the second sub-rule.

In the embodiment of the present disclosure, the second sub-rule may be used to determine the specific DCI data block groups configured to transmit the same information content.

In step 730, the information content in each DCI data block group for repeated transmission is set as a repeatedly transmitted content in the DCI to be sent, and a serial number corresponding to each DCI data block group for repeated transmission is set to be a same serial number.

It can be seen from the embodiment that the repeatedly transmitted content in the DCI to be sent is determined according to the first sub-rule, each DCI data block group for repeated transmission is determined according to the second sub-rule, the information content in each DCI data block group for repeated transmission is set as a repeatedly transmitted content in the DCI to be sent, and the serial number corresponding to each DCI data block group for repeated transmission is set to be the same serial number, such that a personalized requirement of repeated transmission is met, and the service quality of information transmission is also improved.

Figure 8:
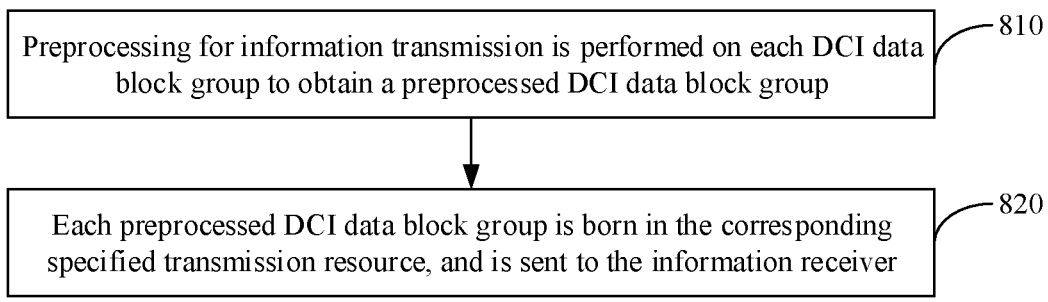
FIG. 8 is a flow chart showing another information transmission method, according to an exemplary embodiment.

FIG. 8 is a flow chart showing another information transmission method, according to an exemplary embodiment. The information transmission method may be applied to an information sender and is based on the method illustrated in FIG. 1. When step 130 is executed, as illustrated in FIG. 8, the following steps 810 to 820 may be included.

In step 810, preprocessing for information transmission is performed on each DCI data block group to obtain a preprocessed DCI data block group.

In the embodiment of the present disclosure, preprocessing for information transmission includes many processes, for example, numbering processing, physical-layer sending processing, and the like. A specific numbering processing process may refer to the embodiment illustrated in FIG. 9.

In step 820, each preprocessed DCI data block group is born in the corresponding specified transmission resource, and is sent to the information receiver.

In the embodiment of the present disclosure, since each DCI data block group may correspond to one specified transmission resource, each preprocessed DCI data block may still correspond to one specified transmission resource, such that the corresponding preprocessed DCI data block group may be sent to the information receiver through the specified transmission resource.

It can be seen from the embodiment that preprocessing for information transmission is performed on each DCI data block group to obtain the preprocessed DCI data block group, and each preprocessed DCI data block group is born in the corresponding specified transmission resource and is sent to the information receiver, such that the information transmission security is improved.

Figure 9:
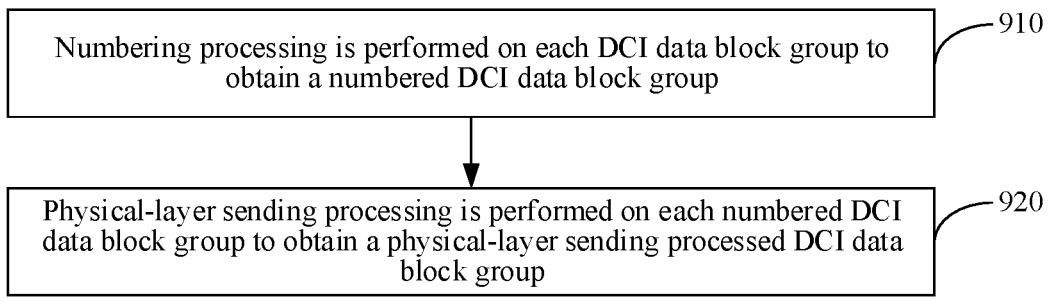
FIG. 9 is a flow chart showing another information transmission method, according to an exemplary embodiment.

FIG. 9 is a flow chart showing another information transmission method, according to an exemplary embodiment. The information transmission method may be applied to an information sender and is based on the method illustrated in FIG. 8. When step 810 is executed, as illustrated in FIG. 9, the following steps 910 to 920 may be included.

In step 910, numbering processing is performed on each DCI data block group to obtain a numbered DCI data block group.

In the embodiment of the present disclosure, the DCI to be sent is divided into N DCI data block groups, and numbering processing may be performed on each DCI data block group. For example, a serial number of the first DCI data block group is 1, a serial number of the second DCI data block group is 2, . . . , and a serial number of the Nth DCI data block group is n.

In step 920, physical-layer sending processing is performed on each numbered DCI data block group to obtain a physical-layer sending processed DCI data block group.

In the embodiment of the present disclosure, a physical-layer sending processing process may refer to operation processing such as cyclic redundancy check (CRC), coding, modulation, precoding and resource mapping over the numbered DCI data block group.

It can be seen from the embodiment that numbering processing is performed on each DCI data block group to obtain the numbered DCI data block group, and physical-layer sending processing is performed on each numbered DCI data block group to obtain the physical-layer sending processed DCI data block group, such that the information transmission security is further improved.

Figure 10:
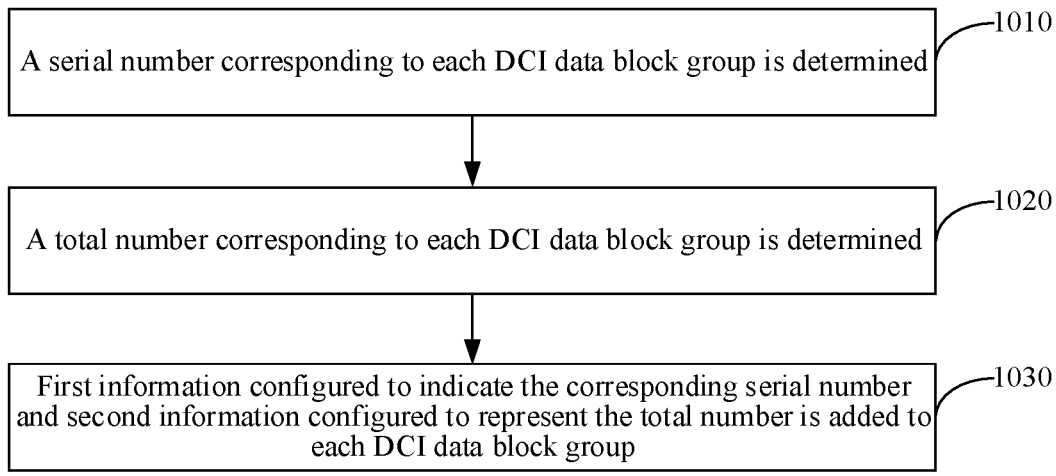
FIG. 10 is a flow chart showing another information transmission method, according to an exemplary embodiment.

FIG. 10 is a flow chart showing another information transmission method, according to an exemplary embodiment. The information transmission method may be applied to an information sender and is based on the method illustrated in FIG. 9. When step 910 is executed, as illustrated in FIG. 10, the following steps 1010 to 1030 may be included.

In step 1010, a serial number corresponding to each DCI data block group is determined.

In step 1020, a total number corresponding to each DCI data block group is determined.

In step 1030, first information configured to indicate the corresponding serial number and second information configured to indicate the total number is added to each DCI data block group.

In the embodiment of the present disclosure, the first information and the second information may be added to a header of the DCI data block group. In addition, an information addition manner may be implemented by bit addition.

It can be seen from the embodiment that the first information configured to indicate the corresponding serial number and the second information configured to indicate the total number may be added to each DCI data block group, such that the information receiver may timely learn the serial number corresponding to a presently received DCI data block group and the total number, thereby reducing the resource consumption of the information receiver.

Figure 11:
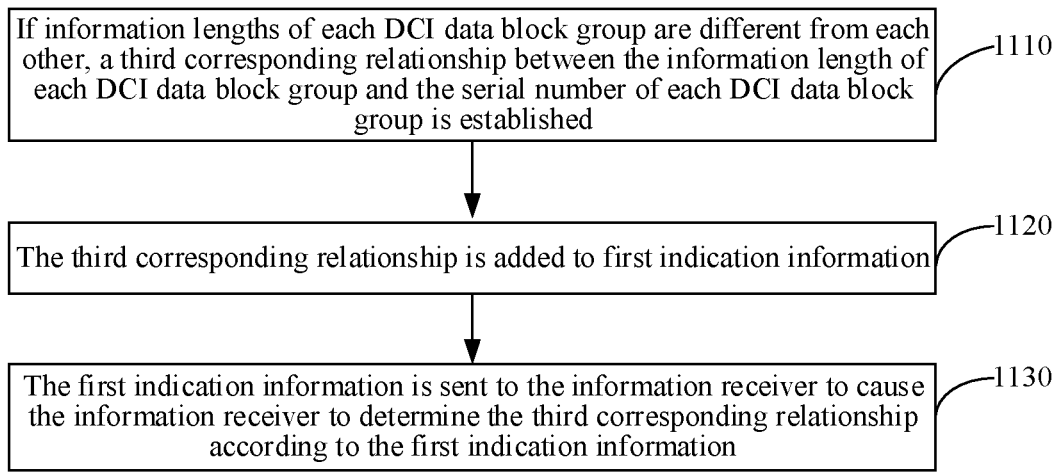
FIG. 11 is a flow chart showing another information transmission method, according to an exemplary embodiment.

FIG. 11 is a flow chart showing another information transmission method, according to an exemplary embodiment. The information transmission method may be applied to an information sender and is based on the method illustrated in FIG. 9. When step 910 is executed, as illustrated in FIG. 11, the following step 1110 may be included.

In step 1110, if information lengths of each DCI data block group are different from each other, a third corresponding relationship between the information length of each DCI data block group and the serial number of each DCI data block group is established.

In the embodiment of the present disclosure, if the information lengths of each DCI data block group are different from each other, the third corresponding relationship between the information length of each DCI data block group and the serial number of the DCI data block group may be established to implicitly transmit the serial number of each DCI data block group.

For example, an information length of a DCI data block group is 30 bit, and a corresponding serial number of the DCI data block group is 1. An information length of a DCI data block group is 15 bit, and a corresponding serial number of the DCI data block group is 2.

In an embodiment, the information transmission method may further include the following steps 1120 to 1130.

In step 1120, the third corresponding relationship is added to first indication information.

In the embodiment of the present disclosure, after determining to implicitly transmit the serial number of each DCI data block group, the information sender may notify the third corresponding relationship between the information length of each DCI data block group and the serial number of each DCI data block group to the information receiver through the first indication information, such that the information receiver may determine the serial number of a presently received DCI data block group according to the third corresponding relationship and the information length of the presently received DCI data block group.

In step 1130, the first indication information is sent to the information receiver to cause the information receiver to determine the third corresponding relationship according to the first indication information.

It can be seen from the embodiment that the third corresponding relationship between the information length of each DCI data block group and the serial number of each DCI data block group may be notified to the information receiver through the first indication information, such that the information receiver may timely learn the serial number corresponding to a presently received DCI data block group and the total number, thereby reducing the resource consumption of the information receiver.

Figure 12:
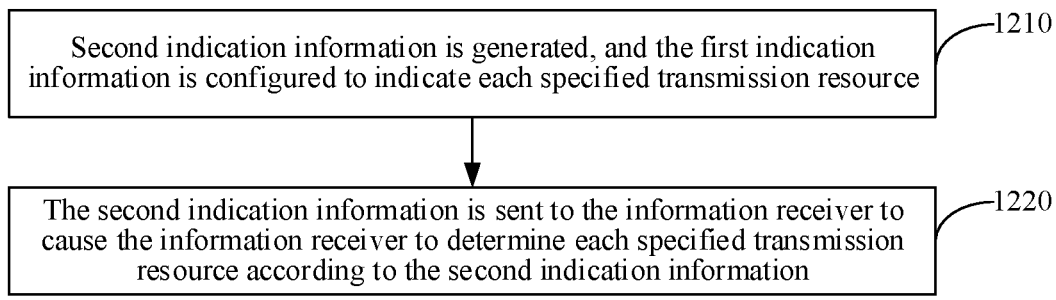
FIG. 12 is a flow chart showing another information transmission method, according to an exemplary embodiment.

FIG. 12 is a flow chart showing another information transmission method, according to an exemplary embodiment. The information transmission method may be applied to an information sender and is based on the method illustrated in FIG. 1. When step 120 is executed, as illustrated in FIG. 12, the following steps 1210 to 1220 may be included.

In step 1210, second indication information is generated, and the second indication information is configured to indicate each specified transmission resource.

In the embodiment of the present disclosure, after configuring different specified transmission resources for each DCI data block group, the information sender may notify these specified transmission resources to the information receiver through the second indication information, such that the information receiver may learn the specified transmission resources on which the DCI data block group is required to be received.

In step 1220, the second indication information is sent to the information receiver to cause the information receiver to determine each specified transmission resource according to the second indication information.

It can be seen from the embodiment that each specified transmission resource for information transmission may be notified to the information receiver through the second indication information, such that the information receiver may timely learn the specified transmission resources on which the DCI data block group is required to be received, thereby improving the information transmission efficiency.

Figure 13:
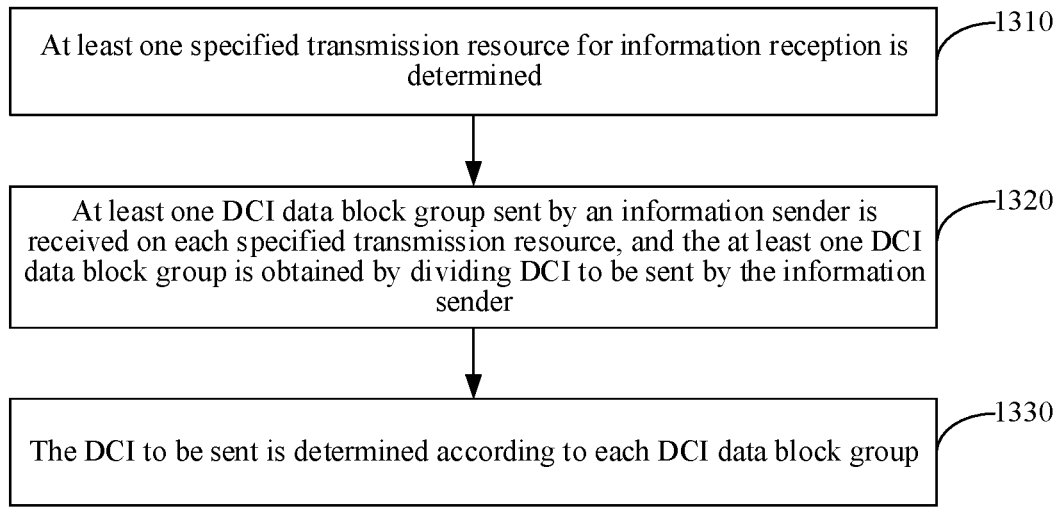
FIG. 13 is a flow chart showing an information transmission method, according to an exemplary embodiment.

FIG. 13 is a flow chart showing another information transmission method, according to an exemplary embodiment. The information transmission method may be applied to an information receiver. The information receiver may be a terminal and may also be a relay base station, and the like. As illustrated in FIG. 13, the information transmission method may include the following steps 1310 to 1330.

In step 1310, at least one specified transmission resource for information reception is determined.

In the embodiment of the present disclosure, the specified transmission resource may be configured and notified to the information receiver by an information sender, and may also be predetermined by the information sender and the information receiver.

In step 1320, at least one DCI data block group sent by an information sender is received on each specified transmission resource, and the at least one DCI data block group is obtained by dividing DCI to be sent by the information sender.

In the embodiment of the present disclosure, one DCI data block group may be born in each specified transmission resource.

In an embodiment, the specified transmission resource may be a specified subframe. For example, DCI to be sent is divided into N DCI data block groups, a specified subframe 1 bears the first DCI data block group, a specified subframe 2 bears the second DCI data block group, . . . , and a specified subframe N bears the Nth DCI data block group.

In step 1330, the DCI to be sent is determined according to each DCI data block group.

In the embodiment of the present disclosure, since the information sender divides the DCI to be sent into the at least one DCI data block group, the information receiver may obtain the DCI to be sent after receiving these DCI data block groups.

In an embodiment, step 1330 may be executed in, but is not limited to, the following manner: at least one of merging processing or reorganization processing is performed on each received DCI data block group to obtain the DCI to be sent.

It can be seen from the embodiment that, the at least one specified transmission resource for information reception is determined, the at least one DCI data block group sent by the information sender is received on each specified transmission resource, and the DCI to be sent is determined according to each DCI data block group, such that block transmission of the DCI is implemented, and the reliability and accuracy of the information transmission are also improved.

Figure 14:
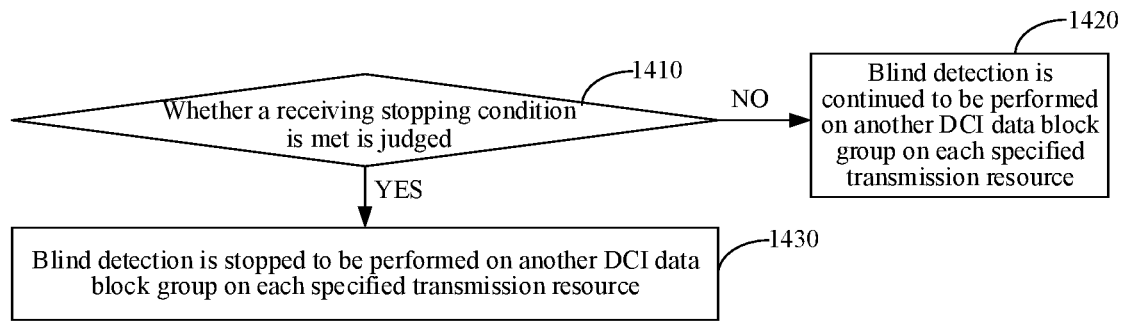
FIG. 14 is a flow chart showing another information transmission method, according to an exemplary embodiment.

FIG. 14 is a flow chart showing another information transmission method, according to an exemplary embodiment. The information transmission method may be applied to an information receiver and is based on the method illustrated in FIG. 13. When step 1320 is executed, as illustrated in FIG. 14, the following steps 1410 to 1430 may be included.

In step 1410, when one DCI data block group is found by blind detection on each specified transmission resource and verification of the DCI data block group passes, whether a receiving stopping condition is met is judged; if NO, step 1420 is executed; and if YES, step 1430 is executed.

In the embodiment of the present disclosure, the receiving stopping condition may be preset by the information sender for a purpose of avoiding resource waste caused by long-term reception.

In an embodiment, the receiving stopping condition in step 1410 may include, but is not limited to, at least one of the following conditions.

(2-1) The receiving stopping condition is that a present DCI data block group is the last one in each DCI data block group required to be sent by the information sender. A specific implementation process thereof may refer to the embodiment illustrated in FIG. 15.

(2-2) The receiving stopping condition is that the present DCI data block group is the last DCI data block group expected to be received by the information receiver. A specific implementation process thereof may refer to the embodiment illustrated in FIG. 16.

In step 1420, the blind detection is continued to be performed on another DCI data block group on each specified transmission resource.

In step 1430, the blind detection is stopped to be performed on another DCI data block group on each specified transmission resource.

It can be seen from the embodiment that whether the receiving stopping condition is met is judged; if NO, the blind detection is continued to be performed on another DCI data block group on each specified transmission resource; and if YES, the blind detection is stopped to be performed on another DCI data block group on each specified transmission resource, such that the resource consumption is reduced.

Figure 15:
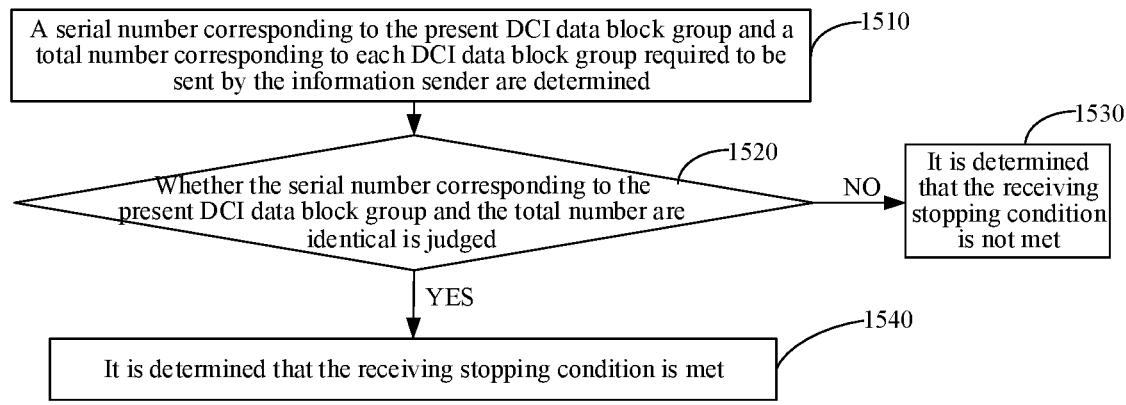
FIG. 15 is a flow chart showing another information transmission method, according to an exemplary embodiment.

FIG. 15 is a flow chart showing another information transmission method, according to an exemplary embodiment. The information transmission method may be applied to an information receiver and is based on the method illustrated in FIG. 14. When step 1410 is executed, the receiving stopping condition is that the present DCI data block group is the last one in each DCI data block group required to be sent by the information sender. As illustrated in FIG. 15, the following steps 1510 to 1540 may be included.

In step 1510, a serial number corresponding to the present DCI data block group and a total number corresponding to each DCI data block group required to be sent by the information sender are determined.

In the embodiment of the present disclosure, how many DCI data block groups sent by the information sender till the present DCI data block group may be determined according to the serial number of the present DCI data block group; if it is the last one sent by the information sender, reception is required to be stopped; and if it is not the last one sent by the information sender, reception is required to be continued.

In step 1520, whether the serial number corresponding to the present DCI data block group and the total number are identical is judged; if NO, step 1530 is executed; and if YES, step 1540 is executed.

In step 1530, it is determined that the receiving stopping condition is not met.

In step 1540, it is determined that the receiving stopping condition is met.

It can be seen from the embodiment that the receiving stopping condition may be that the present DCI data block group is the last one in each DCI data block group required to be sent by the information sender, whether the receiving stopping condition is met is judged; if NO, the blind detection is continued to be performed on another DCI data block group on each specified transmission resource; and if YES, the blind detection is stopped to be performed on another DCI data block group on each specified transmission resource, such that the resource consumption is reduced.

Figure 16:
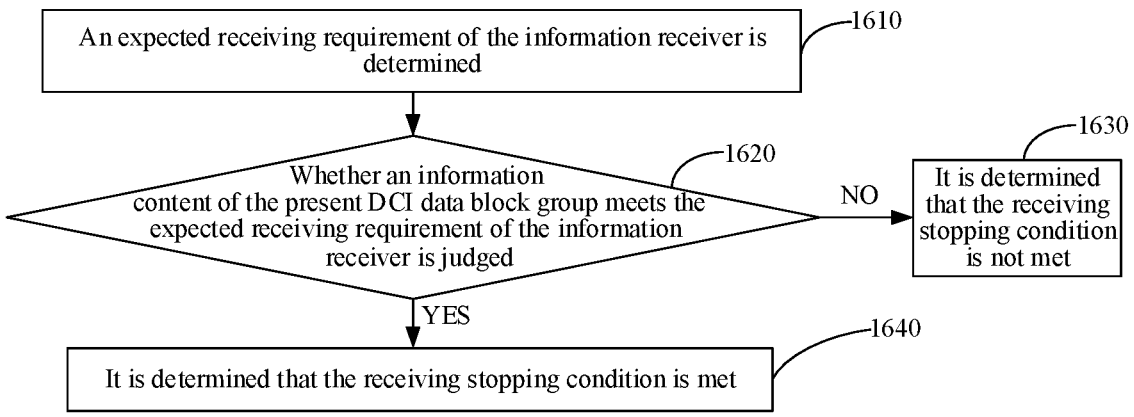
FIG. 16 is a flow chart showing another information transmission method, according to an exemplary embodiment.

FIG. 16 is a flow chart showing another information transmission method, according to an exemplary embodiment. The information transmission method may be applied to an information receiver and is based on the method illustrated in FIG. 14. When step 1410 is executed, the receiving stopping condition is that the present DCI data block group is the last DCI data block group expected to be received by the information receiver. As illustrated in FIG. 16, the following steps 1610 to 1640 may be included.

In step 1610, an expected receiving requirement of the information receiver is determined.

In the embodiment of the present disclosure, specific DCI data block groups to be continuously received may be determined according to the expected receiving requirement of the information receiver. After these DCI data block groups are continuously received, blind detection and reception may be stopped, and other DCI data block groups sent by the information sender are not required to be received.

In step 1620, whether an information content of the present DCI data block group meets the expected receiving requirement of the information receiver is judged; if NO, step 1630 is executed; and if YES, step 1640 is executed.

In step 1630, it is determined that the receiving stopping condition is not met.

In step 1640, it is determined that the receiving stopping condition is met.

It can be seen from the embodiment that the receiving stopping condition may be that the present DCI data block group is the last DCI data block group expected to be received by the information receiver, whether the receiving stopping condition is met is judged; if NO, the blind detection is continued to be performed on another DCI data block group on each specified transmission resource; and if YES, the blind detection is stopped to be performed on another DCI data block group on each specified transmission resource, such that expected receiving requirements of different information receivers are met, and the resource consumption is also reduced.

Corresponding to the embodiments of the information transmission method, the present disclosure also provides embodiments of an information transmission device.

Figure 17:
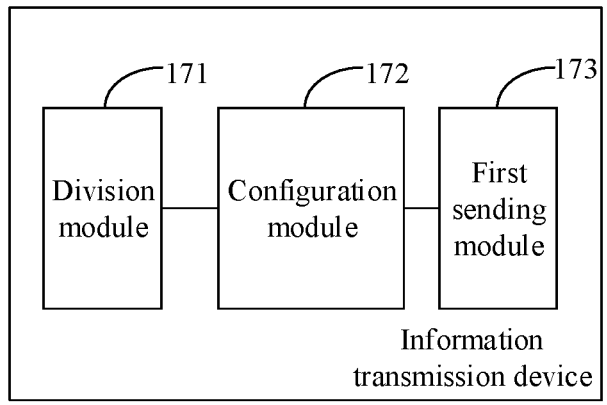
FIG. 17 is a block diagram of an information transmission device, according to an exemplary embodiment.

FIG. 17 is a block diagram of an information transmission device, according to an exemplary embodiment. The device is applied to an information sender. The information sender may be a base station and may also be an HeNB, and the like. The information transmission device is configured to execute the information transmission method illustrated in FIG. 1. As illustrated in FIG. 17, the information transmission device may include: a division module 171, a configuration module 172 and a first sending module 173.

The division module 171 is configured to divide DCI to be sent into at least one DCI data block group.

The configuration module 172 is configured to configure different specified transmission resources for the at least one DCI data block group.

The first sending module 173 is configured to bear each DCI data block group in the corresponding specified transmission resource and send the DCI data block group to an information receiver.

Figure 18:
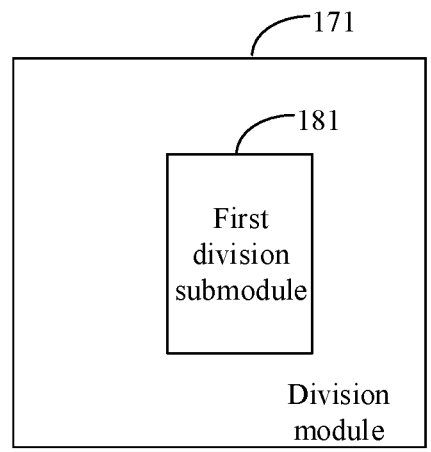
FIG. 18 is a block diagram of another information transmission device, according to an exemplary embodiment.

In an embodiment, based on the device illustrated in FIG. 17, the division module 171 as illustrated in FIG. 18 may include: a first division submodule 181.

The first division submodule 181 is configured to divide the DCI to be sent into the at least one DCI data block group according to a set grouping rule.

It can be seen from the embodiment that the DCI to be sent is divided into the at least one DCI data block group for which different specified transmission resources are configured, each DCI data block group is born in the corresponding specified transmission resource and sent to the information receiver, such that block transmission of the DCI is implemented, and the reliability and accuracy of the information transmission are also improved.

Figure 19:
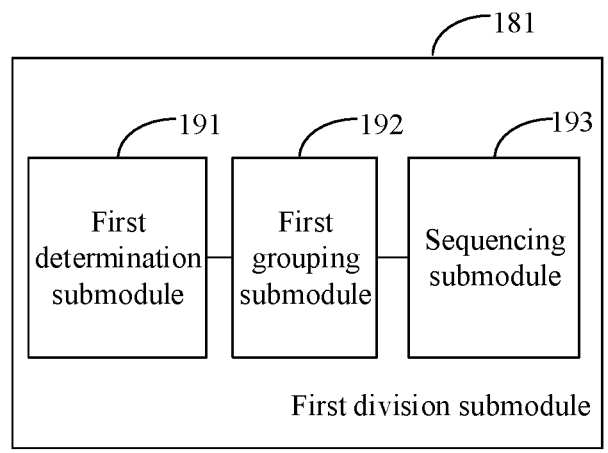
FIG. 19 is a block diagram of another information transmission device, according to an exemplary embodiment.

In an embodiment, based on the device illustrated in FIG. 18, the set grouping rule includes a first grouping rule configured to indicate grouping according to an emergency degree of an information content, and the first grouping rule includes a first corresponding relationship between a specified information content and a specified emergency degree. As illustrated in FIG. 19, the first division submodule 181 may include: a first determination submodule 191, a first grouping submodule 192 and a sequencing submodule 193.

The first determination submodule 191 is configured to determine the emergency degree corresponding to each information content in the DCI to be sent according to the first corresponding relationship.

The first grouping submodule 192 is configured to perform grouping according to the emergency degree corresponding to each information content, and the information contents in the same DCI data block group correspond to the same emergency degree.

The sequencing submodule 193 is configured to sequence each of the at least one DCI data block group according to a sequence from high to low emergency degrees to obtain a first sequence.

It can be seen from the embodiment that grouping is performed according to the emergency degree corresponding to each information content to ensure that the information contents with high emergency degrees are preferentially sent and the information contents with low emergency degrees are delayed to be sent, such that the information transmission flexibility is improved.

Figure 20:
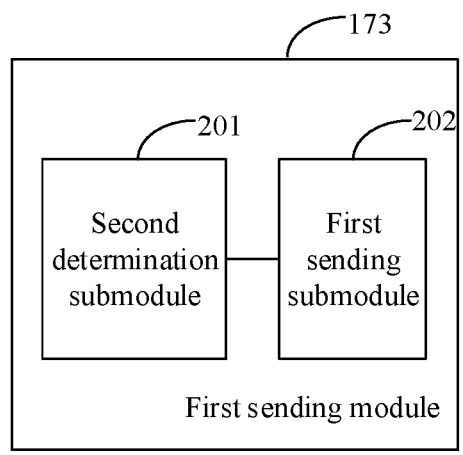
FIG. 20 is a block diagram of another information transmission device, according to an exemplary embodiment.

In an embodiment, based on the device illustrated in FIG. 19, the first sending module 173 as illustrated in FIG. 20 may include: a second determination submodule 201 and a first sending submodule 202.

The second determination submodule 201 is configured to determine the first sequence as a second sequence for sending each DCI data block group.

The first sending submodule 202 is configured to bear each DCI data block group in the corresponding specified transmission resource and sequentially send the DCI data block group to the information receiver according to the second sequence.

It can be seen from the embodiment that the information contents with high emergency degrees are preferentially sent and the information contents with low emergency degrees are delayed to be sent, such that the information transmission practicability is improved.

Figure 21:
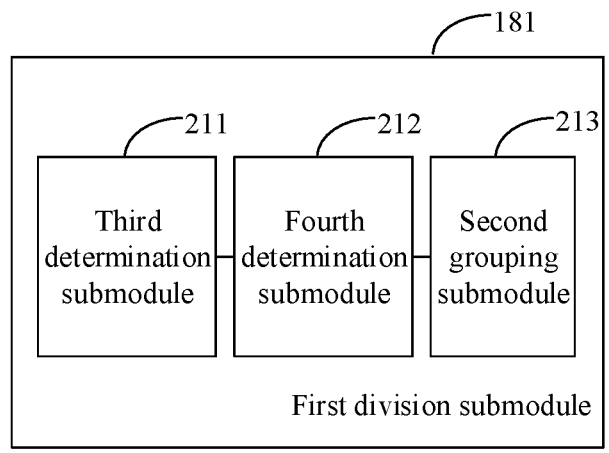
FIG. 21 is a block diagram of another information transmission device, according to an exemplary embodiment.

In an embodiment, based on the device illustrated in FIG. 18, the set grouping rule includes a second grouping rule configured to indicate grouping according to channel quality, and the second grouping rule includes a second corresponding relationship between a specified length for each DCI data block group and the specified channel quality. As illustrated in FIG. 21, the first division submodule 181 may include: a third determination submodule 211, a fourth determination submodule 212 and a second grouping submodule 213.

The third determination submodule 211 is configured to determine the present channel quality.

The fourth determination submodule 212 is configured to determine a specified length of each DCI data block group corresponding to the present channel quality according to the second corresponding relationship.

The second grouping submodule 213 is configured to divide the DCI to be sent into the at least one DCI data block group according to the specified length of each DCI data block group corresponding to the present channel quality.

It can be seen from the embodiment that the DCI to be sent may be divided into the at least one DCI data block group according to the specified length of each DCI data block group corresponding to the present channel quality, such that the DCI grouping accuracy is improved, and the information transmission reliability is also improved.

Figure 22:
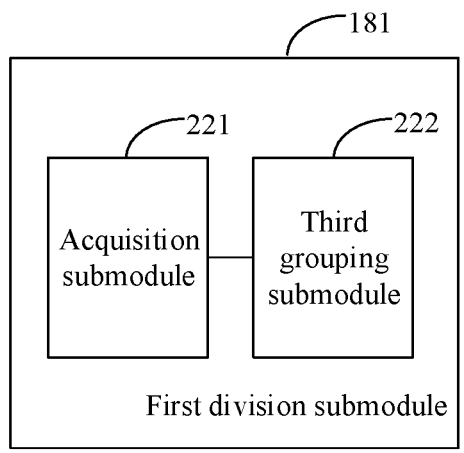
FIG. 22 is a block diagram of another information transmission device, according to an exemplary embodiment.

In an embodiment, based on the device illustrated in FIG. 18, the set grouping rule includes a third grouping rule configured to indicate grouping according to a fixed length of each DCI data block group, and the third grouping rule includes the fixed length of each DCI data block group. As illustrated in FIG. 22, the first division submodule 181 may include: an acquisition submodule 221 and a third grouping submodule 222.

The acquisition submodule 221 is configured to acquire the fixed length of each DCI data block group in the third grouping rule.

The third grouping submodule 222 is configured to divide the DCI to be sent into the at least one DCI data block group according to the fixed length of each DCI data block group.

It can be seen from the embodiment that the DCI to be sent may be divided into the at least one DCI data block group according to the fixed length of each DCI data block group, such that different DCI grouping requirements are met, and the information transmission efficiency is also improved.

Figure 23:
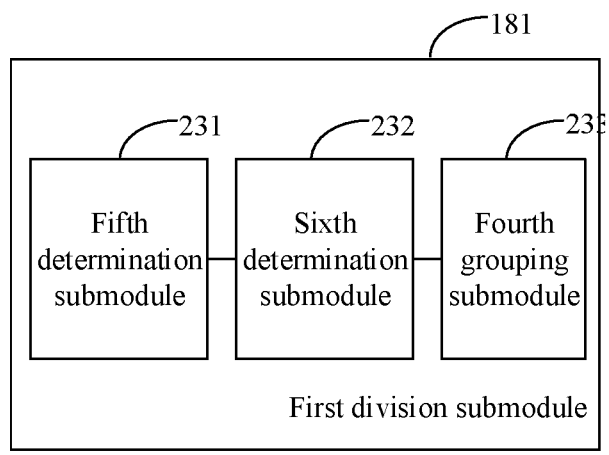
FIG. 23 is a block diagram of another information transmission device, according to an exemplary embodiment.

In an embodiment, based on the device illustrated in FIG. 18, the set grouping rule includes a fourth grouping rule configured to indicate repeated transmission, and the fourth grouping rule includes a first sub-rule configured to determine a repeatedly transmitted content and a second sub-rule configured to determine each DCI data block group for repeated transmission. As illustrated in FIG. 23, the first division submodule 181 may include: a fifth determination submodule 231, a sixth determination submodule 232 and a fourth grouping submodule 233.

The fifth determination submodule 231 is configured to determine a repeatedly transmitted content in the DCI to be sent according to the first sub-rule.

The sixth determination submodule 232 is configured to determine each DCI data block group for repeated transmission according to the second sub-rule.

The fourth grouping submodule 233 is configured to set the information content in each DCI data block group as a repeatedly transmitted content in the DCI to be sent, and set a serial number corresponding to each DCI data block group to be a same serial number.

It can be seen from the embodiment that the repeatedly transmitted content in the DCI to be sent is determined according to the first sub-rule, each DCI data block group for repeated transmission is determined according to the second sub-rule, the information content in each DCI data block group for repeated transmission is set as a repeatedly transmitted content in the DCI to be sent, and the serial number corresponding to each DCI data block group for repeated transmission is set to be the same serial number, such that a personalized requirement of repeated transmission is met, and the service quality of information transmission is also improved.

Figure 24:
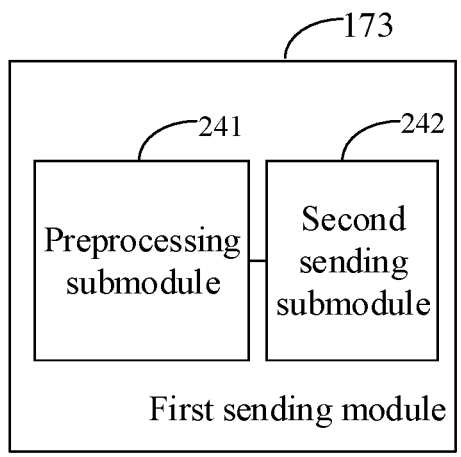
FIG. 24 is a block diagram of another information transmission device, according to an exemplary embodiment.

In an embodiment, based on the device illustrated in FIG. 17, as illustrated in FIG. 24, the first sending module 173 may include: a preprocessing submodule 241 and a second sending submodule 242.

The preprocessing submodule 241 is configured to perform preprocessing for information transmission on each DCI data block group to obtain a preprocessed DCI data block group.

The second sending submodule 242 is configured to bear each preprocessed DCI data block group in the corresponding specified transmission resource and send the preprocessed DCI data block group to the information receiver.

It can be seen from the embodiment that preprocessing for information transmission is performed on each DCI data block group to obtain the preprocessed DCI data block group, and each preprocessed DCI data block group is born in the corresponding specified transmission resource and is sent to the information receiver, such that the information transmission security is improved.

Figure 25:
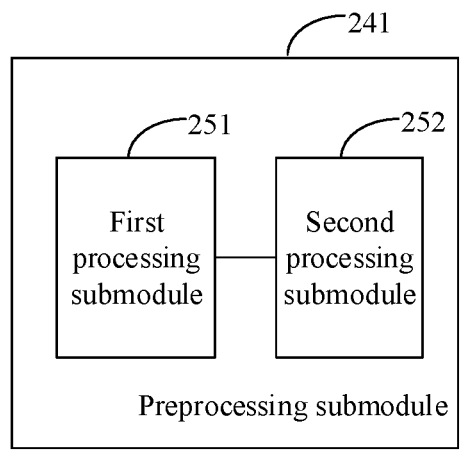
FIG. 25 is a block diagram of another information transmission device, according to an exemplary embodiment.

In an embodiment, based on the device illustrated in FIG. 24, the preprocessing submodule 241 as illustrated in FIG. 25 may include: a first processing submodule 251 and a second processing submodule 252.

The first processing submodule 251 is configured to perform numbering preprocessing on each DCI data block group to obtain a numbered DCI data block group.

The second processing submodule 252 is configured to perform physical-layer sending processing on each numbered DCI data block group to obtain a physical-layer sending processed DCI data block group.

It can be seen from the embodiment that numbering processing is performed on each DCI data block group to obtain the numbered DCI data block group, and physical-layer sending processing is performed on each numbered DCI data block group to obtain the physical-layer sending processed DCI data block group, such that the information transmission security is further improved.

Figure 26:
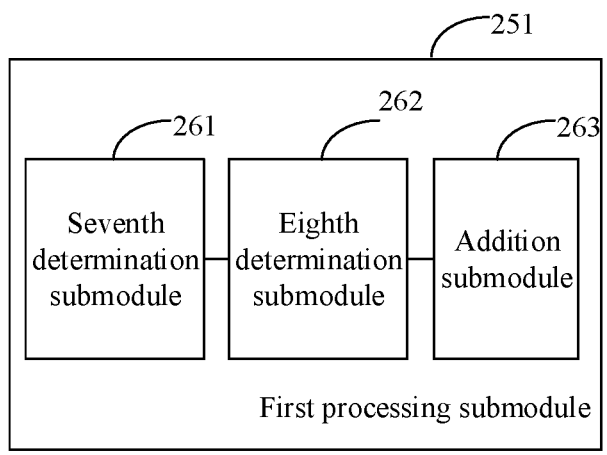
FIG. 26 is a block diagram of another information transmission device, according to an exemplary embodiment.

In an embodiment, based on the device illustrated in FIG. 25, the first processing submodule 251 as illustrated in FIG. 26 may include: a seventh determination submodule 261, an eighth determination submodule 262 and an addition submodule 263.

The seventh determination submodule 261 is configured to determine a serial number corresponding to each DCI data block group.

The eighth determination submodule 262 is configured to determine a total number corresponding to each DCI data block group.

The addition submodule 263 is configured to add first information configured to indicate the corresponding serial number and second information configured to indicate the total number to each DCI data block group.

It can be seen from the embodiment that the first information configured to indicate the corresponding serial number and the second information configured to indicate the total number may be added to each DCI data block group, such that the information receiver may timely learn the serial number corresponding to a presently received DCI data block group and the total number, thereby reducing the resource consumption of the information receiver.

Figure 27:
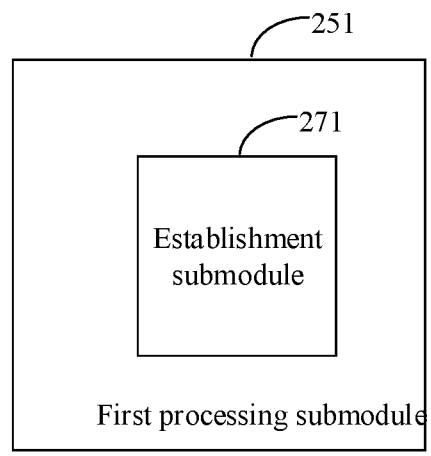
FIG. 27 is a block diagram of another information transmission device, according to an exemplary embodiment.

In an embodiment, based on the device illustrated in FIG. 25, the first processing submodule 251 as illustrated in FIG. 27 may include: an establishment submodule 271.

The establishment submodule 271 is configured to, if information lengths of each DCI data block group are different from each other, establish a third corresponding relationship between the information length of each DCI data block group and the serial number of each DCI data block group.

Figure 28:
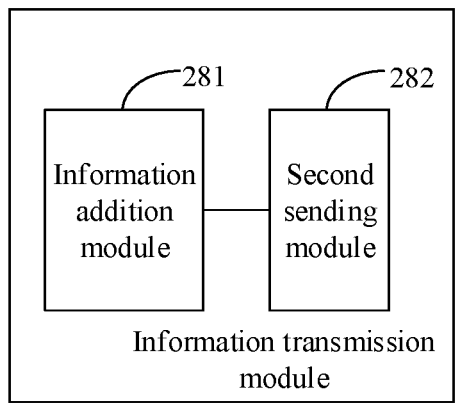
FIG. 28 is a block diagram of another information transmission device, according to an exemplary embodiment.

In an embodiment, based on the device illustrated in FIG. 27, the information transmission device as illustrated in FIG. 28 may further include: an information addition module 281 and a second sending module 282.

The information addition module 281 is configured to add the third corresponding relationship to first indication information.

The second sending module 282 is configured to send the first indication information to the information receiver to cause the information receiver to determine the third corresponding relationship according to the first indication information.

It can be seen from the embodiment that the third corresponding relationship between the information length of each DCI data block group and the serial number of each DCI data block group may be notified to the information receiver through the first indication information, such that the information receiver may timely learn the serial number corresponding to a presently received DCI data block group and the total number, thereby reducing the resource consumption of the information receiver.

Figure 29:
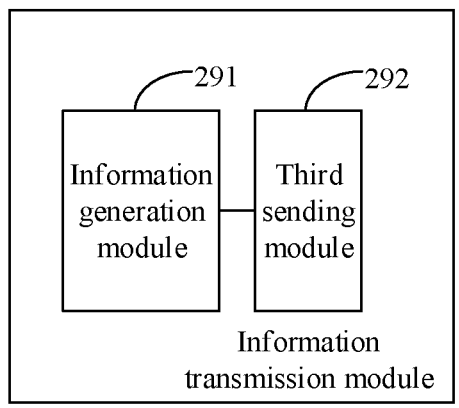
FIG. 29 is a block diagram of another information transmission device, according to an exemplary embodiment.

In an embodiment, based on the device illustrated in FIG. 17, the information transmission device as illustrated in FIG. 29 may further include: an information generation module 291 and a third sending module 292.

The information generation module 291 is configured to generate second indication information, and the second indication information is configured to indicate each specified transmission resource.

The third sending module 292 is configured to send the second indication information to the information receiver to cause the information receiver to determine each specified transmission resource according to the second indication information.

It can be seen from the embodiment that each specified transmission resource for information transmission may be notified to the information receiver through the second indication information, such that the information receiver may timely learn the specified transmission resources on which the DCI data block group is required to be received, thereby improving the information transmission efficiency.

Figure 30:
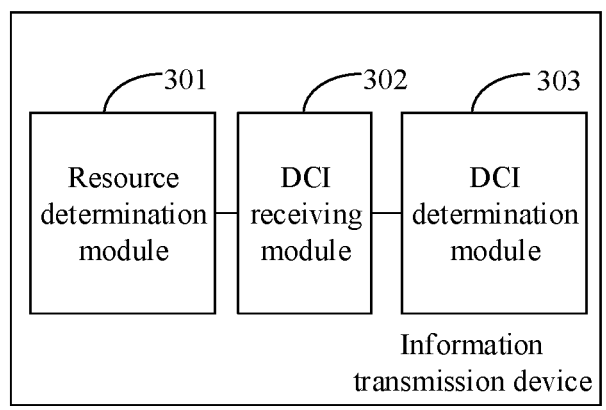
FIG. 30 is a block diagram of an information transmission device, according to an exemplary embodiment.

FIG. 30 is a block diagram of an information transmission device, according to an exemplary embodiment. The device may be applied to an information receiver. The information receiver may be a terminal, and may also be a relay base station, and the like. The information transmission device is configured to execute the information transmission method illustrated in FIG. 13. As illustrated in FIG. 30, the information transmission device may include: a resource determination module 301, a DCI receiving module 302 and a DCI determination module 303.

The resource determination module 301 is configured to determine at least one specified transmission resource for information reception.

The DCI receiving module 302 is configured to receive at least one DCI data block group sent by an information sender on each specified transmission resource, and the at least one DCI data block group is obtained by dividing DCI to be sent by the information sender.

The DCI determination module 303 is configured to determine the DCI to be sent according to each DCI data block group. It can be seen from the embodiment that, the at least one specified transmission resource for information reception is determined, the at least one DCI data block group sent by the information sender is received on each specified transmission resource, and the DCI to be sent is determined according to each DCI data block group, such that block transmission of the DCI is implemented, and the reliability and accuracy of the information transmission are also improved.

Figure 31:
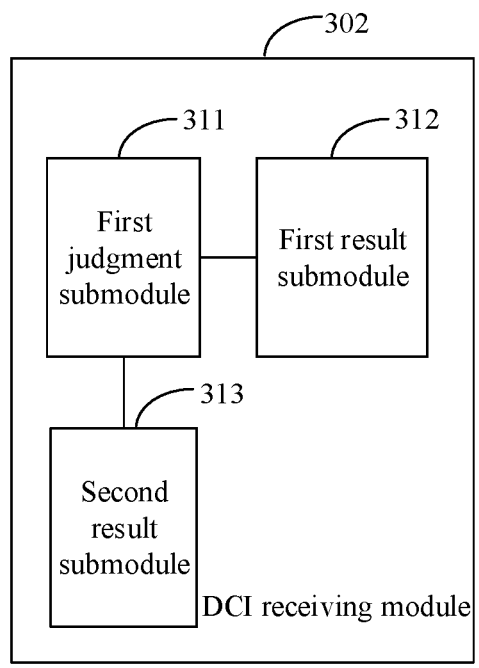
FIG. 31 is a block diagram of another information transmission device, according to an exemplary embodiment.

In an embodiment, based on the device illustrated in FIG. 30, the DCI receiving module 302 as illustrated in FIG. 31 may include: a first judgment submodule 311, a first result submodule 312 and a second result submodule 313.

The first judgment submodule 311 is configured to, when one DCI data block group is found by blind detection on each specified transmission resource and verification of the DCI data block group passes, judge whether a receiving stopping condition is met.

The first result submodule 312 is configured to, if the receiving stopping condition is not met, continue performing the blind detection on another DCI data block group on each specified transmission resource.

The second result submodule 313 is configured to, if the receiving stopping condition is met, stop performing the blind detection on another DCI data block group on each specified transmission resource.

It can be seen from the embodiment that whether the receiving stopping condition is met is judged; if NO, the blind detection is continued to be performed on another DCI data block group on each specified transmission resource; and if YES, the blind detection is stopped to be performed on another DCI data block group on each specified transmission resource, such that the resource consumption is reduced.

Figure 32:
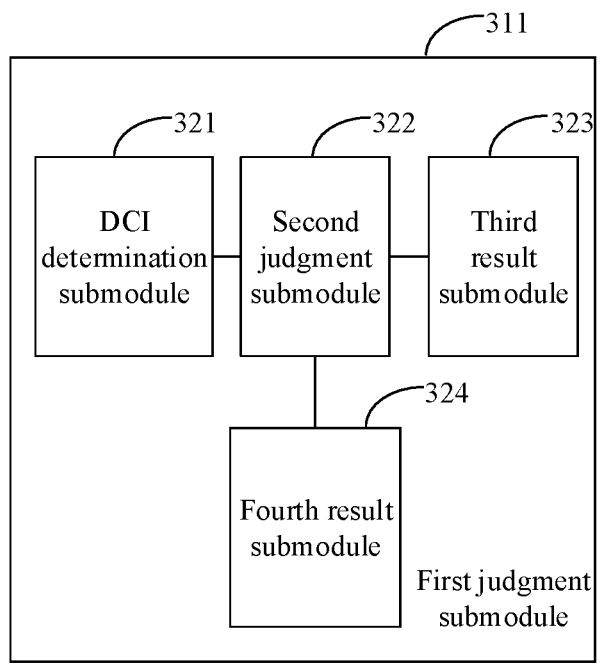
FIG. 32 is a block diagram of another information transmission device, according to an exemplary embodiment.

In an embodiment, based on the device illustrated in FIG. 31, the receiving stopping condition is that a present DCI data block group is the last one in each DCI data block group required to be sent by the information sender. As illustrated in FIG. 32, the first judgment submodule 311 may include: a DCI determination submodule 321, a second judgment submodule 322, a third result submodule 323 and a fourth result submodule 324.

The DCI determination submodule 321 is configured to determine a serial number corresponding to the present DCI data block group and a total number corresponding to each DCI data block group required to be sent by the information sender.

The second judgment submodule 322 is configured to judge whether the serial number and the total number are identical.

The third result submodule 323 is configured to, if it is determined that the serial number and the total number are different, determine that the receiving stopping condition is not met.

The fourth result submodule 324 is configured to, if it is determined that the serial number and the total number are identical, determine that the receiving stopping condition is met.

It can be seen from the embodiment that the receiving stopping condition may be that the present DCI data block group is the last one in each DCI data block group required to be sent by the information sender, whether the receiving stopping condition is met is judged; if NO, the blind detection is continued to be performed on another DCI data block group on each specified transmission resource; and if YES, the blind detection is stopped to be performed on another DCI data block group on each specified transmission resource, such that the resource consumption is reduced.

Figure 33:
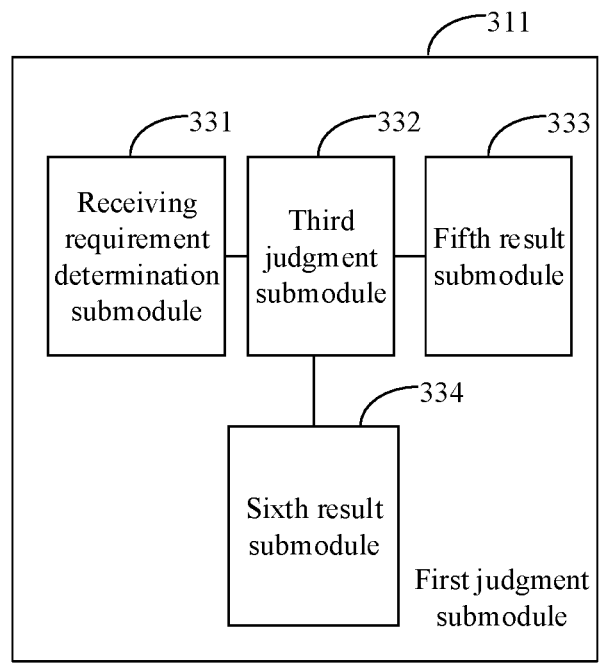
FIG. 33 is a block diagram of another information transmission device, according to an exemplary embodiment.

In an embodiment, based on the device illustrated in FIG. 31, the receiving stopping condition is that the present DCI data block group is a last DCI data block group expected to be received by the information receiver. As illustrated in FIG. 33, the first judgment submodule 311 may include: a receiving requirement determination submodule 331, a third judgment submodule 332, a fifth result submodule 333 and a sixth result submodule 334.

The receiving requirement determination submodule 331 is configured to determine an expected receiving requirement of the information receiver.

The third judgment submodule 332 is configured to judge whether an information content of the present DCI data block group meets the expected receiving requirement.

The fifth result submodule 333 is configured to, if it is determined that the information content of the present DCI data block group does not meet the expected receiving requirement, determine that the receiving stopping condition is not met.

The sixth result submodule 334 is configured to, if it is determined that the information content of the present DCI data block group meets the expected receiving requirement, determine that the receiving stopping condition is met.

It can be seen from the embodiment that the receiving stopping condition may be that the present DCI data block group is the last DCI data block group expected to be received by the information receiver, whether the receiving stopping condition is met is judged; if NO, the blind detection is continued to be performed on another DCI data block group on each specified transmission resource; and if YES, the blind detection is stopped to be performed on another DCI data block group on each specified transmission resource, such that expected receiving requirements of different information receivers are met, and the resource consumption is also reduced.

Figure 34:
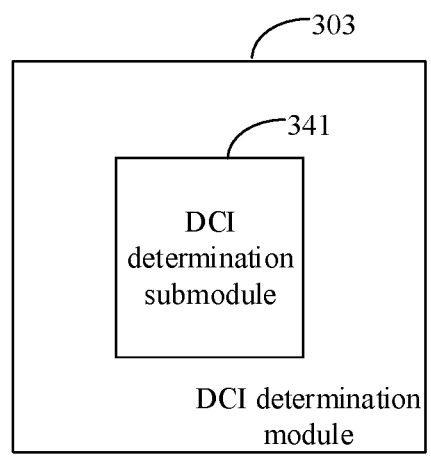
FIG. 34 is a block diagram of another information transmission device, according to an exemplary embodiment.

In an embodiment, based on the device illustrated in FIG. 30, the DCI determination module 303 as illustrated in FIG. 34 may include: a DCI determination submodule 341, configured to perform at least one of merging processing or reorganization processing on each DCI data block group to obtain the DCI to be sent.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement without creative work.

The present disclosure also provides a non-transitory computer-readable storage medium, in which a computer program is stored, the computer program being configured to execute any information transmission method illustrated in FIG. 1 to FIG. 12.

The present disclosure also provides a non-transitory computer-readable storage medium, in which a computer program is stored, the computer program being configured to execute any information transmission method illustrated in FIG. 13 to FIG. 16.

The present disclosure also provides an information transmission device, which is applied to an information sender and includes: a processor; and a memory configured to store instructions executable by the processor.

The processor is configured to: divide DCI to be sent into at least one DCI data block group; configure different specified transmission resources for the at least one DCI data block group; bear each DCI data block group in the corresponding specified transmission resource; and send the DCI data block group to an information receiver.

Figure 35:
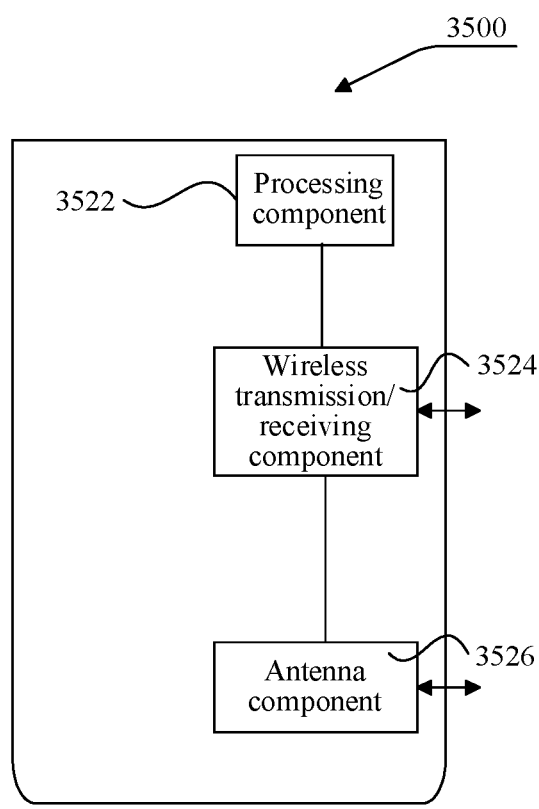
FIG. 35 is a structure diagram of an information transmission device, according to an exemplary embodiment.

As illustrated in FIG. 35, FIG. 35 is a structure diagram of an information transmission device, according to an exemplary embodiment. The device 3500 may be provided as an information sender, and the information sender may be a base station and may also be an HeNB, and the like. Referring to FIG. 35, the device 3500 includes a processing component 3522, a wireless transmission/receiving component 3524, an antenna component 3526 and a wireless interface-specific signal processing part. The processing component 3522 may further include one or more processors.

One processor in the processing component 3522 may be configured to execute any information transmission method.

The present disclosure also provides an information transmission device, which is applied to an information receiver and includes: a processor; and a memory configured to store instructions executable by the processor.

The processor is configured to: determine at least one specified transmission resource for information reception; receive at least one DCI data block group sent by an information sender on each specified transmission resource, the at least one DCI data block group being obtained by dividing DCI to be sent by the information sender; and determine the DCI to be sent according to each DCI data block group.

Figure 36:
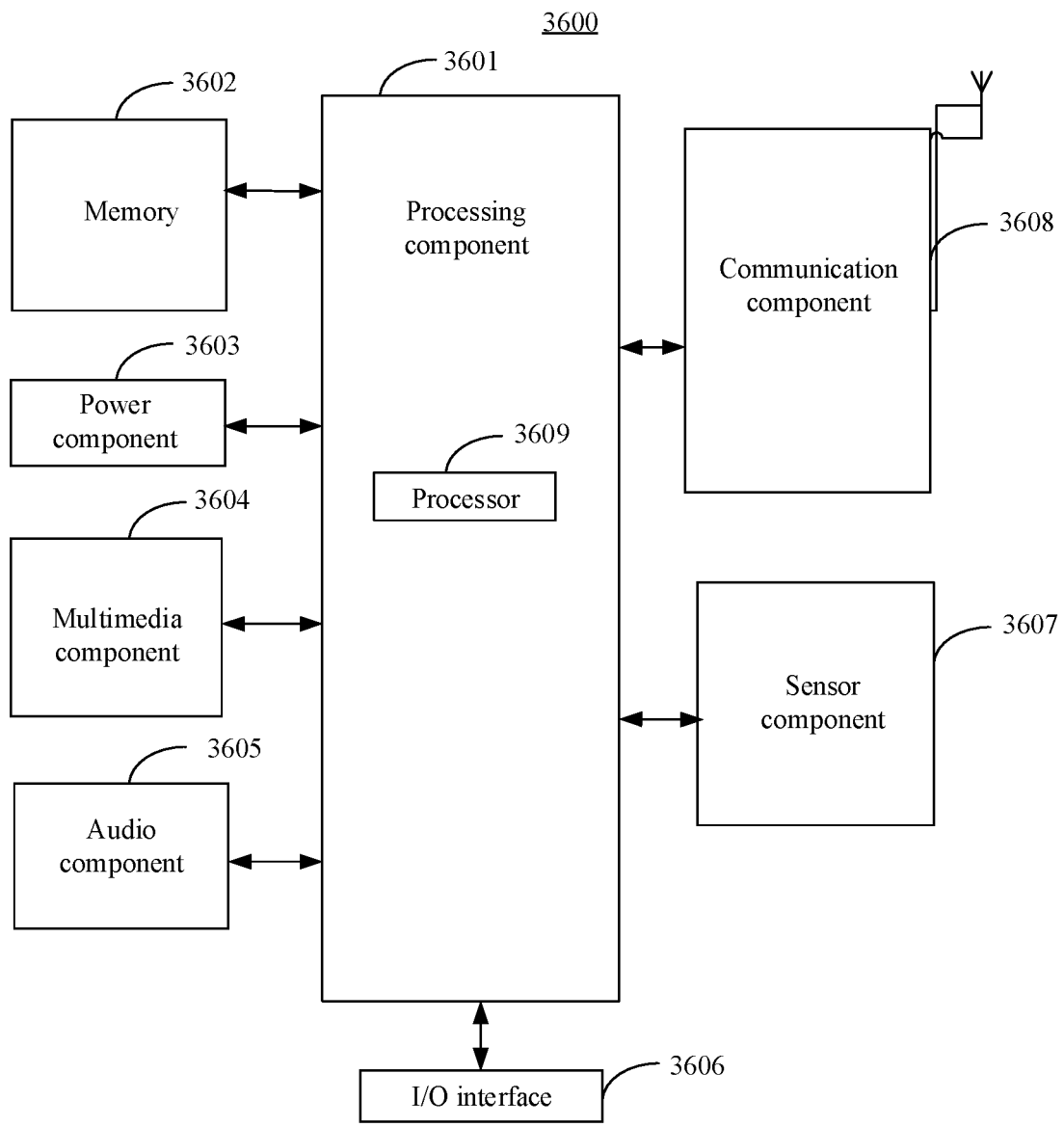
FIG. 36 is a structure diagram of an information transmission device, according to an exemplary embodiment.

FIG. 36 is a structure diagram of an information transmission device, according to an exemplary embodiment. FIG. 36 illustrates an information transmission device 3600 according to an exemplary embodiment. The device 3600 may be a terminal such as a computer, a mobile phone, a digital broadcast terminal, a messaging device, a gaming console, a tablet, a medical device, exercise equipment, a personal digital assistant, and the like.

Referring to FIG. 36, the device 3600 may include one or more of the following components: a processing component 3601, a memory 3602, a power component 3603, a multimedia component 3604, an audio component 3605, an input/output (I/O) interface 3606, a sensor component 3607, and a communication component 3608.

The processing component 3601 typically controls overall operations of the device 3600, such as the operations associated with display, telephone calls, data communications, camera operations, and recording operations. The processing component 3601 may include one or more processors 3609 to execute instructions to perform all or part of the steps in the abovementioned method. Moreover, the processing component 3601 may include one or more modules which facilitate interaction between the processing component 3601 and other components. For instance, the processing component 3601 may include a multimedia module to facilitate interaction between the multimedia component 3604 and the processing component 3601.

The memory 3602 is configured to store various types of data to support the operation of the device 3600. Examples of such data include instructions for any applications or methods operated on the device 3600, contact data, phonebook data, messages, pictures, video, etc. The memory 3602 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 3603 provides power for various components of the device 3600. The power component 3603 may include a power management system, one or more power supplies, and other components associated with generation, management and distribution of power for the device 3600.

The multimedia component 3604 includes a screen providing an output interface between the device 3600 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 3604 includes a front camera and/or a rear camera. The front camera and/or the rear camera may receive external multimedia data when the device 3600 is in an operation mode, such as a photographing mode or a video mode. Each of the front camera and the rear camera may be a fixed optical lens system or have focusing and optical zooming capabilities.

The audio component 3605 is configured to output and/or input an audio signal. For example, the audio component 3605 includes a microphone (MIC), and the MIC is configured to receive an external audio signal when the device 3600 is in an operation mode, such as a call mode, a recording mode and a voice recognition mode. The received audio signal may further be stored in the memory 3602 or sent through the communication component 3608. In some embodiments, the audio component 3605 further includes a speaker configured to output the audio signal.

The I/O interface 3606 provides an interface between the processing component 3601 and peripheral interface modules, such as a keyboard, a click wheel, buttons, and the like. The buttons may include, but are not limited to: a home button, a volume button, a starting button and a locking button.

The sensor component 3607 includes one or more sensors configured to provide status assessments in various aspects for the device 3600. For instance, the sensor component 3607 may detect an on/off status of the device 3600 and relative positioning of components, such as a display and small keyboard of the device 3600, and the sensor component 3607 may further detect a change in a position of the device 3600 or a component of the device 3600, presence or absence of contact between the user and the device 3600, orientation or acceleration/deceleration of the device 3600 and a change in temperature of the device 3600. The sensor component 3607 may include a proximity sensor configured to detect presence of an object nearby without any physical contact. The sensor component 3607 may also include a light sensor, such as a complementary metal oxide semiconductor (CMOS) or charge coupled device (CCD) image sensor, configured for use in an imaging application. In some embodiments, the sensor component 3607 may also include an acceleration sensor, a gyroscope sensor, a magnetic sensor, a pressure sensor or a temperature sensor.

The communication component 3608 is configured to facilitate wired or wireless communication between the device 3600 and other devices. The device 3600 may access a communication-standard-based wireless network, such as a wireless fidelity (WiFi) network, a 2nd-generation (2G) or 3rd-generation (3G) network or a combination thereof. In an exemplary embodiment, the communication component 3608 receives a broadcast signal or broadcast associated information from an external broadcast management system through a broadcast channel. In an exemplary embodiment, the communication component 3608 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology and other technologies.

In an exemplary embodiment, the device 3600 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

In an exemplary embodiment, there is also provided a non-transitory computer-readable storage medium including instructions, such as included in the memory 3602, executable by the processor 3609 of the device 3600 for performing the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

The instructions in the storage medium are executed by the processor to cause the device 3600 to execute any information transmission methods.

Optionally, the operation that the DCI to be sent is divided into the at least one DCI data block group may include: the DCI to be sent is divided into the at least one DCI data block group according to a set grouping rule.

Optionally, the set grouping rule may include a first grouping rule configured to indicate grouping according to an emergency degree of an information content, and the first grouping rule may include a first corresponding relationship between a specified information content and a specified emergency degree.

The operation that the DCI to be sent is divided into the at least one DCI data block group according to the set grouping rule may include: the emergency degree corresponding to each information content in the DCI to be sent is determined according to the first corresponding relationship; grouping is performed according to the emergency degree corresponding to each information content, and the information contents in the same DCI data block group correspond to the same emergency degree; and each of the at least one DCI data block group is sequenced according to a sequence from high to low emergency degrees to obtain a first sequence.

Optionally, the operation that each DCI data block group is born in the corresponding specified transmission resource and the DCI data block group is sent to the information receiver may include: the first sequence is determined as a second sequence for sending each DCI data block group; and each of the at least one DCI data block group is born in the corresponding specified transmission resource and the DCI data block group is sequentially sent to the information receiver according to the second sequence.

Optionally, the set grouping rule may include a second grouping rule configured to indicate grouping according to channel quality, and the second grouping rule may include a second corresponding relationship between a specified length for each DCI data block group and the specified channel quality.

The operation that the DCI to be sent is divided into the at least one DCI data block group according to the set grouping rule may include: the present channel quality is determined; a specified length of each DCI data block group corresponding to the present channel quality is determined according to the second corresponding relationship; and the DCI to be sent is divided into the at least one DCI data block group according to the specified length of each DCI data block group corresponding to the present channel quality.

Optionally, the set grouping rule may include a third grouping rule configured to indicate grouping according to a fixed length of each DCI data block group, and the third grouping rule may include the fixed length of each DCI data block group.

The operation that the DCI to be sent is divided into the at least one DCI data block group according to the set grouping rule may include: the fixed length of each DCI data block group in the third grouping rule is acquired; and the DCI to be sent is divided into the at least one DCI data block group according to the fixed length of each DCI data block group.

Optionally, the set grouping rule may include a fourth grouping rule configured to indicate repeated transmission, and the fourth grouping rule may include a first sub-rule configured to determine a repeatedly transmitted content and a second sub-rule configured to determine each DCI data block group for repeated transmission.

The operation that the DCI to be sent is divided into the at least one DCI data block group according to the set grouping rule may include: a repeatedly transmitted content in the DCI to be sent is determined according to the first sub-rule; each DCI data block group for repeated transmission is determined according to the second sub-rule; and the information content in each DCI data block group is set as a repeatedly transmitted content in the DCI to be sent, and a serial number corresponding to each DCI data block group is set to be a same serial number.

Optionally, the operation that each DCI data block group is born in one or more different corresponding specified transmission resources and the DCI data block group is sent to the information receiver may include: preprocessing for information transmission is performed on each DCI data block group to obtain a preprocessed DCI data block group; and each preprocessed DCI data block group is born in the corresponding specified transmission resource and the preprocessed DCI data block group is sent to the information receiver.

Optionally, the operation that the preprocessing for information transmission is performed on each DCI data block group to obtain the preprocessed DCI data block group may include: numbering processing is performed on each DCI data block group to obtain a numbered DCI data block group; and physical-layer sending processing is performed on each numbered DCI data block group to obtain a physical-layer sending processed DCI data block group.

Optionally, the operation that the numbering processing is performed on each DCI data block group may include: a serial number corresponding to each DCI data block group is determined; a total number corresponding to each DCI data block group is determined; and first information configured to indicate the corresponding serial number and second information configured to indicate the total number is added to each DCI data block group.

Optionally, the operation that the numbering processing is performed on each DCI data block group may include: in response to information lengths of each DCI data block group being different from each other, a third corresponding relationship between the information length of each DCI data block group and the serial number of each DCI data block group is established.

Optionally, the method may further include: the third corresponding relationship is added to first indication information; and the first indication information is sent to the information receiver to cause the information receiver to determine the third corresponding relationship according to the first indication information.

Optionally, the method may further include: second indication information is generated, and the second indication information is configured to indicate each specified transmission resource; and the second indication information is sent to the information receiver to cause the information receiver to determine each specified transmission resource according to the second indication information.

Optionally, the operation that the at least one DCI data block group sent by the information sender is received on each specified transmission resource may include: in response to one DCI data block group being found by blind detection on each specified transmission resource and verification of the DCI data block group passing, whether a receiving stopping condition is met is judged; in response to the receiving stopping condition being not met, the blind detection is continued to be performed on another DCI data block group on each specified transmission resource; and in response to the receiving stopping condition being met, the blind detection is stopped to be performed on another DCI data block group on each specified transmission resource.

Optionally, the receiving stopping condition may be that a present DCI data block group is a last one in each DCI data block group required to be sent by the information sender.

The operation that whether the receiving stopping condition is met is judged may include: a serial number corresponding to the present DCI data block group and a total number corresponding to each DCI data block group required to be sent by the information sender are determined; whether the serial number and the total number are identical is judged; in response to determining that the serial number and the total number are different, it is determined that the receiving stopping condition is not met; and in response to determining that the serial number and the total number are identical, it is determined that the receiving stopping condition is met.

Optionally, the receiving stopping condition may be that a present DCI data block group is a last DCI data block group expected to be received by the information receiver.

The operation that whether the receiving stopping condition is met is judged may include: an expected receiving requirement of the information receiver is determined; whether an information content of the present DCI data block group meets the expected receiving requirement is judged; in response to determining that the information content of the present DCI data block group does not meet the expected receiving requirement, it is determined that the receiving stopping condition is not met; and in response to determining that the information content of the present DCI data block group meets the expected receiving requirement, it is determined that the receiving stopping condition is met.

Optionally, the operation that the DCI to be sent is determined according to each DCI data block group may include: at least one of merging processing or reorganization processing is performed on each DCI data block group to obtain the DCI to be sent.

Optionally, the division module may include: a first division submodule, configured to divide the DCI to be sent into the at least one DCI data block group according to a set grouping rule.

Optionally, the set grouping rule may include a first grouping rule configured to indicate grouping according to an emergency degree of an information content, and the first grouping rule may include a first corresponding relationship between a specified information content and a specified emergency degree.

The first division submodule may include: a first determination submodule, configured to determine the emergency degree corresponding to each information content in the DCI to be sent according to the first corresponding relationship; a first grouping submodule, configured to perform grouping according to the emergency degree corresponding to each information content, the information contents in the same DCI data block group corresponding to the same emergency degree; and a sequencing submodule, configured to sequence each of the at least one DCI data block group according to a sequence from high to low emergency degrees to obtain a first sequence.

Optionally, the first sending module may include: a second determination submodule, configured to determine the first sequence as a second sequence for sending each DCI data block group; and a first sending submodule, configured to bear each of the at least one DCI data block group in the corresponding specified transmission resource and sequentially send the DCI data block group to the information receiver according to the second sequence.

Optionally, the set grouping rule may include a second grouping rule configured to indicate grouping according to channel quality, and the second grouping rule may include a second corresponding relationship between a specified length for each DCI data block group and the specified channel quality.

The first division submodule may include: a third determination submodule, configured to determine the present channel quality; a fourth determination submodule, configured to determine a specified length of each DCI data block group corresponding to the present channel quality according to the second corresponding relationship; and a second grouping submodule, configured to divide the DCI to be sent into the at least one DCI data block group according to the specified length of each DCI data block group corresponding to the present channel quality.

Optionally, the set grouping rule may include a third grouping rule configured to indicate grouping according to a fixed length of each DCI data block group, and the third grouping rule may include the fixed length of each DCI data block group.

The first division submodule may include: an acquisition submodule, configured to acquire the fixed length of each DCI data block group in the third grouping rule; and a third grouping submodule, configured to divide the DCI to be sent into the at least one DCI data block group according to the fixed length of each DCI data block group.

Optionally, the set grouping rule may include a fourth grouping rule configured to indicate repeated transmission, and the fourth grouping rule may include a first sub-rule configured to determine a repeatedly transmitted content and a second sub-rule configured to determine each DCI data block group for repeated transmission.

The first division submodule may include: a fifth determination submodule, configured to determine a repeatedly transmitted content in the DCI to be sent according to the first sub-rule; a sixth determination submodule, configured to determine each DCI data block group for repeated transmission according to the second sub-rule; and a fourth grouping submodule, configured to set the information content in each DCI data block group as a repeatedly transmitted content in the DCI to be sent and set a serial number corresponding to each DCI data block group to be a same serial number.

Optionally, the first sending module may include: a preprocessing submodule, configured to perform preprocessing for information transmission on each DCI data block group to obtain a preprocessed DCI data block group; and a second sending submodule, configured to bear each preprocessed DCI data block group in the corresponding specified transmission resource and send the preprocessed DCI data block group to the information receiver.

Optionally, the preprocessing submodule may include: a first processing submodule, configured to perform numbering preprocessing on each DCI data block group to obtain a numbered DCI data block group; and a second processing submodule, configured to perform physical-layer sending processing on each numbered DCI data block group to obtain a physical-layer sending processed DCI data block group.

Optionally, the first processing submodule may include: a seventh determination submodule, configured to determine a serial number corresponding to each DCI data block group; an eighth determination submodule, configured to determine a total number corresponding to each DCI data block group; and an addition submodule, configured to add first information configured to indicate the corresponding serial number and second information configured to indicate the total number to each DCI data block group.

Optionally, the first processing submodule may include: an establishment submodule, configured to, in response to information lengths of each DCI data block group being different from each other, establish a third corresponding relationship between the information length of each DCI data block group and the serial number of each DCI data block group.

Optionally, the device may further include: an information addition module, configured to add the third corresponding relationship to first indication information; and a second sending module, configured to send the first indication information to the information receiver to cause the information receiver to determine the third corresponding relationship according to the first indication information.

Optionally, the device may further include: an information generation module, configured to generate second indication information, the second indication information being configured to indicate each specified transmission resource; and a third sending module, configured to send the second indication information to the information receiver to cause the information receiver to determine each specified transmission resource according to the second indication information.

Optionally, the DCI receiving module may include: a first judgment submodule, configured to, in response to one DCI data block group being found by blind detection on each specified transmission resource and verification of the DCI data block group passing, judge whether a receiving stopping condition is met; a first result submodule, configured to, in response to the receiving stopping condition being not met, continue performing the blind detection on another DCI data block group on each specified transmission resource; and a second result submodule, configured to, in response to the receiving stopping condition being met, stop performing the blind detection on another DCI data block group on each specified transmission resource.

Optionally, the receiving stopping condition may be that a present DCI data block group is a last one in each DCI data block group required to be sent by the information sender.

The first judgment submodule may include: a DCI determination submodule, configured to determine a serial number corresponding to the present DCI data block group and a total number corresponding to each DCI data block group required to be sent by the information sender; a second judgment submodule, configured to judge whether the serial number and the total number are identical; a third result submodule, configured to, in response to determining that the serial number and the total number are different, determine that the receiving stopping condition is not met; and a fourth result submodule, configured to, in response to determining that the serial number and the total number are identical, determine that the receiving stopping condition is met.

Optionally, the receiving stopping condition may be that a present DCI data block group is a last DCI data block group expected to be received by the information receiver.

The first judgment submodule may include: a receiving requirement determination submodule, configured to determine an expected receiving requirement of the information receiver; a third judgment submodule, configured to judge whether an information content of the present DCI data block group meets the expected receiving requirement; a fifth result submodule, configured to, in response to determining that the information content of the present DCI data block group does not meet the expected receiving requirement, determine that the receiving stopping condition is not met; and a sixth result submodule, configured to, in response to determining that the information content of the present DCI data block group meets the expected receiving requirement, determine that the receiving stopping condition is met.

Optionally, the DCI determination module may include: a DCI determination submodule, configured to perform at least one of merging processing or reorganization processing on each DCI data block group to obtain the DCI to be sent.

The processor may be configured to: divide DCI to be sent into at least one DCI data block group; configure different specified transmission resources for the at least one DCI data block group; bear each DCI data block group in the corresponding specified transmission resource; and send the DCI data block group to an information receiver.

The processor may be configured to: determine at least one specified transmission resource for information reception; receive at least one DCI data block group sent by an information sender on each specified transmission resource, the at least one DCI data block group being obtained by dividing DCI to be sent by the information sender; and determine the DCI to be sent according to each DCI data block group.

The technical solutions provided in the embodiments of the present disclosure may have the following beneficial effects.

In the present disclosure, the information sender may divide the DCI to be sent into the at least one DCI data block group, configure different specified transmission resources for the at least one DCI data block group, bear each DCI data block group in the corresponding specified transmission resource, and send the DCI data block group to the information receiver, such that block transmission of the DCI is implemented, and the reliability and accuracy of the information transmission are also improved.

In the present disclosure, the information receiver may determine the at least one specified transmission resource for information reception, receive the at least one DCI data block group sent by the information sender on each specified transmission resource and determine the DCI to be sent according to each DCI data block group, such that block transmission of the DCI is implemented, and the reliability and accuracy of the information transmission are also improved.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An information transmission method, applied to an information sender and comprising:
   dividing downlink control information (DCI) to be sent into at least one DCI data block group according to a set grouping rule, wherein the set grouping rule comprises a first grouping rule configured to indicate grouping according to an emergency degree of an information content;

configuring one transmission resource for each of the at least one DCI data block group, different DCI data block groups corresponding to different transmission resources;

bearing each DCI data block group in the corresponding transmission resource; and sending the at least one DCI data block group to an information receiver;

wherein the first grouping rule comprises a first corresponding relationship between a specified information content and a specified emergency degree; and wherein dividing the DCI to be sent into the at least one DCI data block group according to the set grouping rule comprises:

determining the emergency degree corresponding to each information content in the DCI to be sent according to the first corresponding relationship;

performing grouping according to the emergency degree corresponding to each information content, the information contents in one DCI data block group corresponding to the same emergency degree; and sequencing each of the at least one DCI data block group according to a sequence from high to low emergency degrees to obtain a first sequence.

2. The method of claim 1, wherein bearing each DCI data block group in the corresponding transmission resource and sending the DCI data block group to the information receiver comprises:

determining the first sequence as a second sequence for sending each DCI data block group; and bearing each DCI data block group in the corresponding transmission resource and sequentially sending each DCI data block group to the information receiver according to the second sequence.

3. The method of claim 1, wherein bearing each DCI data block group in one or more different corresponding transmission resources and sending the DCI data block group to the information receiver comprises:

performing preprocessing for information transmission on each DCI data block group to obtain a preprocessed DCI data block group; and bearing each preprocessed DCI data block group in the corresponding transmission resource and sending the preprocessed DCI data block group to the information receiver.

4. The method of claim 3, wherein performing the preprocessing for information transmission on each DCI data block group to obtain the preprocessed DCI data block group comprises:

performing numbering processing on each DCI data block group to obtain a numbered DCI data block group; and performing physical-layer sending processing on each numbered DCI data block group to obtain a physical-layer sending processed DCI data block group.

5. The method of claim 4, wherein performing the numbering processing on each DCI data block group comprises:

determining a serial number corresponding to each DCI data block group;

determining a total number corresponding to each DCI data block group; and adding first information configured to indicate the corresponding serial number and second information configured to indicate the total number to each DCI data block group.

6. The method of claim 4, wherein performing the numbering processing on each DCI data block group comprises:

in response to information lengths of each DCI data block group being different from each other, establishing a third corresponding relationship between the information length of each DCI data block group and the serial number of each DCI data block group.

7. The method of claim 6, further comprising:

adding the third corresponding relationship to first indication information; and sending the first indication information to the information receiver to cause the information receiver to determine the third corresponding relationship according to the first indication information.

8. The method of claim 1, further comprising:

generating second indication information, the second indication information being configured to indicate each transmission resource; and sending the second indication information to the information receiver to cause the information receiver to determine each transmission resource according to the second indication information.

9. A non-transitory computer-readable storage medium, in which a computer program is stored, the computer program being configured to execute the information transmission method of claim 1.

10. An information transmission method, applied to an information receiver and comprising:

determining at least one transmission resource for information reception;

receiving at least one downlink control information (DCI) data block group sent by an information sender on each transmission resource, the at least one DCI data block group being obtained by dividing DCI to be sent by the information sender, wherein the DCI to be sent is divided according to a set grouping rule; wherein the set grouping rule comprises at least one of: a first grouping rule configured to indicate grouping according to an emergency degree of an information content, a second grouping rule configured to indicate grouping according to channel quality, or a fourth grouping rule configured to indicate repeated transmission; and determining the DCI to be sent according to the at least one DCI data block group;

wherein receiving the at least one DCI data block group sent by the information sender on each transmission resource comprises:

in response to one DCI data block group being found by blind detection on each transmission resource and verification of the DCI data block group passing determining whether a receiving stopping condition is met;

in response to the receiving stopping condition being not met, continuing the blind detection on another DCI data block group on each transmission resource; and in response to the receiving stopping condition being met, stopping the blind detection on another DCI data block group on each transmission resource;

wherein the receiving stopping condition is that a present DCI data block group is a last one in each DCI data block group required to be sent by the information sender; and wherein determining whether the receiving stopping condition is met comprises:

determining a serial number corresponding to the present DCI data block group and a total number corresponding to each DCI data block group required to be sent by the information sender;

determining whether the serial number and the total number are identical;

in response to determining that the serial number and the total number are different, determining that the receiving stopping condition is not met; and in response to determining that the serial number and the total number are identical. determining that the receiving stopping condition is met.

11. The method of claim 10, wherein the receiving stopping condition is that a present DCI data block group is a last DCI data block group expected to be received by the information receiver;

wherein determining whether the receiving stopping condition is met comprises:

determining an expected receiving requirement of the information receiver;

determining whether an information content of the present DCI data block group meets the expected receiving requirement;

in response to determining that the information content of the present DCI data block group does not meet the expected receiving requirement, determining that the receiving stopping condition is not met; and in response to determining that the information content of the present DCI data block group meets the expected receiving requirement, determining that the receiving stopping condition is met.

12. The method of claim 10, wherein determining the DCI to be sent according to each DCI data block group comprises:

performing at least one of merging processing or reorganization processing on each DCI data block group to obtain the DCI to be sent.

13. A non-transitory computer-readable storage medium, in which a computer program is stored, the computer program being configured to execute the information transmission method of claim 10.

14. An information transmission method, applied to an information sender and comprising:

dividing downlink control information (DCI) to be sent into at least one DCI data block group according to a set grouping rule, wherein the set grouping rule comprises a second grouping rule configured to indicate grouping according to channel quality;

configuring one transmission resource for each of the at least one DCI data block group, different DCI data block groups corresponding to different transmission resources;

bearing each DCI data block group in the corresponding transmission resource; and sending the at least one DCI data block group to an information receiver;

wherein the second grouping rule comprises a second corresponding relationship between a specified length for each DCI data block group and the specified channel quality; and wherein dividing the DCI to be sent into the at least one DCI data block group according to the set grouping rule comprises:

determining the present channel quality;

determining a specified length of each DCI data block group corresponding to the present channel quality according to the second corresponding relationship; and dividing the DCI to be sent into the at least one DCI data block group according to the specified length of each DCI data block group corresponding to the present channel quality.

* * * * *